(12) United States Patent
Rofougaran et al.

(10) Patent No.: US 12,149,328 B1
(45) Date of Patent: Nov. 19, 2024

(54) WIRELESS COMMUNICATION SYSTEM AND METHOD FOR HIGH-PERFORMANCE LOW-LATENCY FIXED WIRELESS ACCESS USING HYBRID REPEATER DEVICES

(71) Applicant: Peltbeam Inc., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Dan Nguyen, Huntington Beach, CA (US); Arman Rofougaran, Newport Coast, CA (US); Milan Rofougaran, Newport Coast, CA (US); Kavian Odabaee, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 18/655,152

(22) Filed: May 3, 2024

(51) Int. Cl.
  *H04B 7/15* (2006.01)
  *H04B 1/00* (2006.01)
  *H04B 7/0408* (2017.01)
  *H04B 7/155* (2006.01)
  *H04W 36/18* (2009.01)

(52) U.S. Cl.
  CPC ....... *H04B 7/15557* (2013.01); *H04B 1/0007* (2013.01); *H04B 7/0408* (2013.01); *H04W 36/18* (2013.01)

(58) Field of Classification Search
  CPC  H04B 7/15557; H04B 1/0007; H04B 7/0408; H04W 36/18
  See application file for complete search history.

(56) References Cited

U.S. PATENT DOCUMENTS

| | | | |
|---|---|---|---|
| 2014/0050253 A1* | 2/2014 | Jovanovic | H04L 27/2602 375/211 |
| 2022/0045746 A1* | 2/2022 | Abedini | H04B 7/15528 |
| 2022/0345193 A1* | 10/2022 | Braun | H04B 7/0413 |

* cited by examiner

Primary Examiner — Hashim S Bhatti
(74) Attorney, Agent, or Firm — CHIP LAW GROUP

(57) ABSTRACT

A wireless communication system including a master wireless access point device communicates a WLAN signal in first WLAN frequency from a data source. A plurality of hybrid analog-digital repeater devices are disposed at a plurality of different locations, where a first hybrid analog-digital repeater device receives the WLAN signal from the master wireless access point device, convert the WLAN signal to a first beam of radio frequency (RF) signal in an intermediate frequency band, and relays the first beam of RF signals in the intermediate frequency band to one or more second hybrid analog-digital repeater devices of the plurality of hybrid analog-digital repeater devices. One or more service wireless access point devices receives the first beam of RF signals from the one or more second hybrid analog-digital repeater devices and convert back to the WLAN signal to serve user equipment in a data throughput greater than a threshold throughput.

20 Claims, 9 Drawing Sheets

WIRELESS COMMUNICATION SYSTEM AND METHOD FOR HIGH-PERFORMANCE LOW-LATENCY FIXED WIRELESS ACCESS USING HYBRID REPEATER DEVICES

CROSS-REFERENCE TO RELATED APPLICATIONS/INCORPORATION BY REFERENCE

None

FIELD OF TECHNOLOGY

Certain embodiments of the disclosure relate to a wireless communication system for fixed wireless access (FWA). More specifically, certain embodiments of the disclosure relate to a wireless communication system and method for high-performance, low-latency fixed wireless access using hybrid repeater devices.

BACKGROUND

Conventional communication devices, such as wireless access points (WAPs), are often used to extend the wireless coverage of an existing Wi-Fi signal to access the Internet and to increase the number of end-user devices capable of using Wi-Fi® may connect to the WAPs. However, Wi-Fi® signals, under the limitation of the Wi-Fi® communication protocol, have a defined range beyond which the connectivity is lost. Thus, many WAPs or range extenders are used if wireless coverage for Wi-Fi® signals is to be extended. Moreover, under ideal conditions, typically, 2.4 GHz Wi-Fi® supports up to 450 Mbps or 600 Mbps, and 5 GHz Wi-Fi® supports up to 1300 Mbps. Thus, the data transmission over such narrow bandwidth is much lower than higher radio frequencies.

The emergence of fifth-generation (5G) technology standards for cellular networks has unleashed unprecedented possibilities across industries fueled by multi-gigabit speeds, massive capacity, and low latency. However, prohibitive infrastructure costs have challenged full-scale realization. Legacy wireless systems also face inconsistencies around throughput, resilience, and complexity. This necessitates carrier-grade wireless connectivity to deliver fiber-like consistency combined with agile, scalable deployment models. Furthermore, latency and signal noise are other technical problems with existing wireless communication systems and network architecture. Such latency increases when more wireless access points or relay nodes are introduced to extend the communication range.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A wireless communication system and method for high-performance, low latency fixed wireless access using hybrid repeater devices, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a wireless communication system and method for high-performance, low latency, fixed wireless access using hybrid repeater devices. The hybrid repeater devices may be primarily analog repeater devices where the data propagation path in the wireless communication system is analog with some digital processing performed for signal metadata extraction and an external network control, and thus may be referred to as hybrid analog-digital repeater devices. The wireless communication system intelligently balances the simplicity and low latency of analog signal relaying with the flexibility and intelligence of digital processing in a hybrid architecture. This hybrid approach allows to achieve not only the low latency and high efficiency of analog signal relaying but also the flexibility and programmability of digital signal processing. The wireless communication system and method of the present disclosure not only improves data transfer rates between at least two communication devices as compared to existing wireless systems (e.g. conventional wireless local area networks (WLANs), Wi-Fi® systems, or traditional Wi-Fi® mesh networks), but also enables almost near zero latency communication and an always-connected experience.

In the following description, reference is made to the accompanying drawings, which form a part hereof, and in which is shown, by way of illustration, various embodiments of the present disclosure.

Figure 1A:
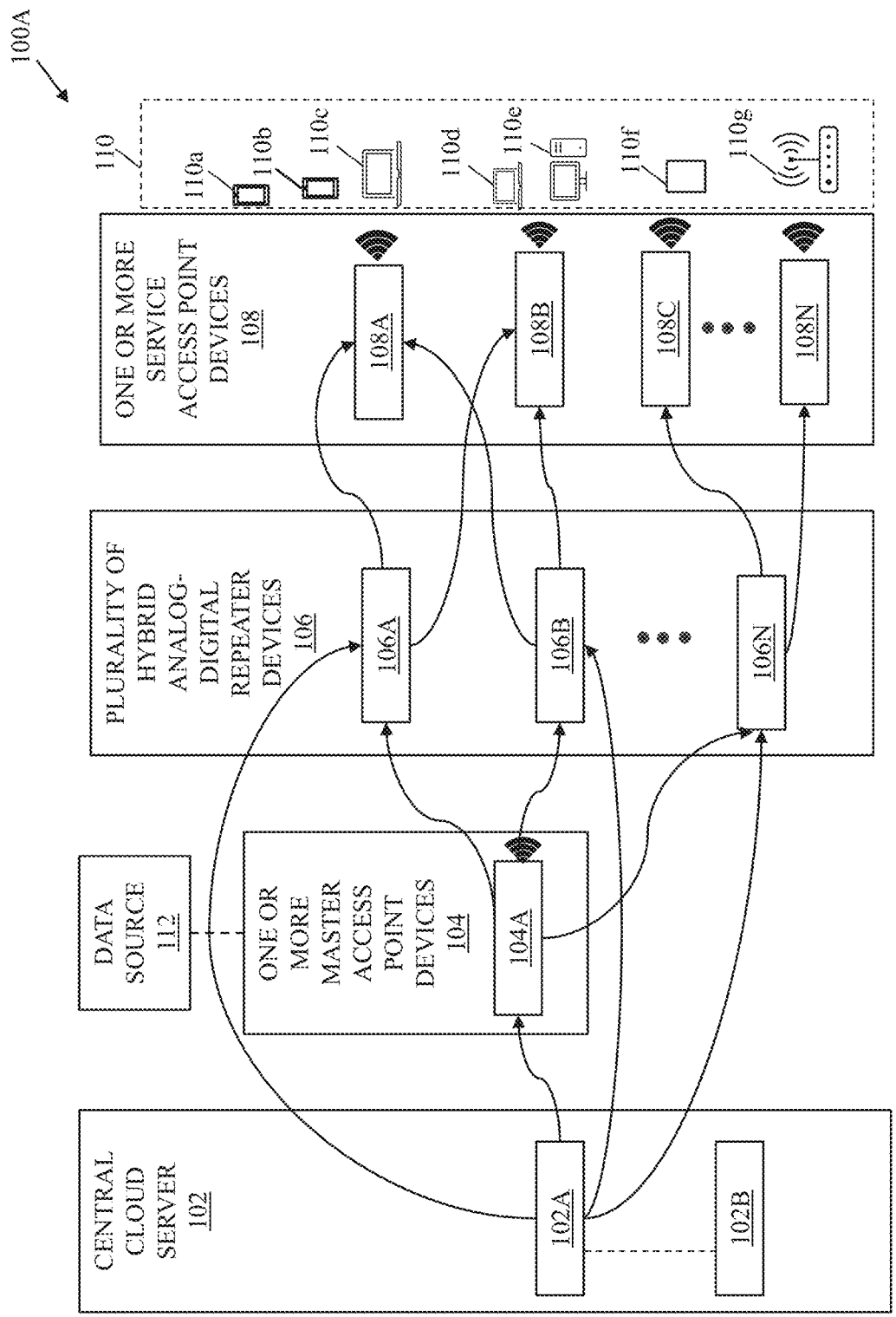
FIG. 1A is a diagram that illustrates an exemplary wireless communication system, in accordance with an exemplary embodiment of the disclosure.

FIG. 1A is a diagram that illustrates an exemplary wireless communication system, in accordance with an exemplary embodiment of the disclosure. With reference to FIG. 1A, there is shown a wireless communication system 100A. The wireless communication system 100A may include a central cloud server 102, one or more master Wireless Access Point (WAP) devices 104, a plurality of hybrid analog-digital repeater devices 106, and one or more service WAP devices 108. There is further shown one or more user equipment (UEs) 110 (e.g., UEs 110a to 110g) and a data source 112. The central cloud server 102 may include one or more processors, such as the processor 102A, and a neural network model 102B.

The central cloud server 102 includes suitable logic, circuitry, and interfaces that may be configured to communicate with the one or more master WAP devices 104 and the plurality of hybrid analog-digital repeater devices 106. In an implementation, the central cloud server 102 may be communicatively coupled to each network node (e.g., communicatively coupled to the one or more service WAP devices 108 and the one or more UEs 110). In an example, the central cloud server 102 may be a remote management server that is managed by a third party different from the service providers associated with the plurality of different wireless carrier networks (WCNs). In another example, the central cloud server 102 may be a remote management server or a data center that is managed by a third party, or jointly managed, or managed in coordination and association with one or more of the plurality of different WCNs. In an implementation, the central cloud server 102 may be a master cloud server or a master machine that is a part of a data center that controls an array of other cloud servers communicatively coupled to it for load balancing, running customized applications, and efficient data management.

The processor 102A may be further configured to cause each network node of the wireless communication system 100A to determine location information of a plurality of neighboring nodes around each network node. Each network node may determine its geo-location and the geo-location of the neighboring nodes. In an implementation, each of the plurality of hybrid analog-digital repeater devices 106 may further comprise a position sensor (e.g., a gyroscope) or a location sensor (e.g., a global positioning system (GPS) sensor or other geospatial location sensor). In another implementation, each network node may further include Wi-Fi capability, which may be used, for example, to determine its location coordinates or location coordinates of neighboring nodes (e.g., nearby mesh nodes) by received signal strength indication (RSSI)-based triangulation or WI-FI®-based triangulation process, known in the art. Examples of the processor 102A of the central cloud server 102 may include but are not limited to a central processing unit (CPU), graphical processing unit (GPU), a Reduced Instruction Set Computing (RISC) processor, an Application-Specific Integrated Circuit (ASIC) processor, a Complex Instruction Set Computing (CISC) processor, and/or other processors, or state machines.

The neural network model 102B of the central cloud server 102 may be periodically (e.g., daily and for different times-of-day) trained on data points (e.g., telemetry information) uploaded to the central cloud server 102 by each network node, such as the one or more master WAP devices 104, the plurality of hybrid analog-digital repeater devices 106, and the one or more service WAP devices 108.

The one or more master WAP devices 104 includes suitable logic, circuitry, and interfaces that may be configured to provide access to the Internet or wireless backhaul in 5G or 6G networks. Examples of the one or more master WAP devices 104 may include, but is not limited to a home gateway device, a 5G wireless access point, a wireless router, a fifth generation (5G) modem, a backplane system, an evolved-universal terrestrial radio access-new radio (NR) dual connectivity (EN-DC) device, an advanced router, a bridge router, a network controller, a fixed wireless access (FWA) device, a firewall device, or a network security device, or one or more combinations thereof.

The plurality of hybrid analog-digital repeater devices 106 may be disposed as a radio frequency (RF) bridge between the master WAP device 104A and the one or more service WAP devices 108 such that a data propagation path of user data relayed through a network of the plurality of hybrid analog-digital repeater devices 106 may be analog without any digital decoding or encoding of the user data in a RF signal to reduce latency less than a threshold time. For example, the data propagation path may comprise high-frequency analog circuitry to minimize latency to nanoseconds. Multi-hop relaying of intermediate frequency signals (e.g. mmWave signals) may happen without any digital encoding or decoding of the user data (i.e., payload). Further, a backchannel connectivity and control of the network of the plurality of hybrid analog-digital repeater devices 106 may be via a lower WLAN frequency (e.g., 2.4 GHZ or 5 Ghz of Wi-Fi® 7 or 8), based on a signal metadata of the incoming RF signal. While the data propagation path may remain entirely analog for lowest latency, the plurality of hybrid analog-digital repeater devices 106 may extract the signal metadata from RF signals for analysis. This allows deriving wireless metrics like timing parameters, signal quality, interference levels, channel state information, and reference signals using digital signal processing (DSP) techniques. Thus, the simplicity and low latency of analog signal relaying is intelligently combined with the flexibility and intelligence of digital processing in a hybrid architecture. The plurality of hybrid analog-digital repeater devices 106 extends the coverage area of the master WAP device 104A and one or more service WAP devices 108, allowing them to serve its corresponding UEs in areas that may have poor signal reception.

The one or more service WAP devices 108 may be configured to receive a beam of RF signals in the intermediate frequency band (e.g., mmWave frequency or intermediate frequency in range of 10-300 GHz) from the one or more second hybrid analog-digital repeater devices (e.g., the hybrid analog-digital repeater devices 106B to 106N) and convert back to the WLAN signal to serve one or more UEs 110 in a data throughput greater than a threshold throughput. Each of the master WAP device 104A and the one or more service WAP devices 108 may be configured to perform Multi-User, Multiple Input, Multiple Output (Mu-MIMO) to corresponding connected UEs via corresponding mmWave New Radio Unlicensed (NR-U) links. The use of intermediate frequencies (e.g., millimeter-wave frequencies) and Mu-MIMO together may provide high data rates and efficient use of the available spectrum.

Each of one or more UEs 110 may correspond to a wireless device, such as a client device or a telecommunication hardware used by an end-user to communicate. Some of the one or more UEs 110 may refer to a combination of a mobile equipment and subscriber identity module (SIM). Examples of the one or more UEs 110 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

In an implementation, the data source 112 of the master WAP device 104A may be one or more of an optical fiber port connected to an optical fiber for an Internet connection, an Ethernet port connected to an Ethernet cable for the Internet connection, or a 5G or 6G mmWave cellular signal received from a radio access network (RAN) node.

Currently, in WLAN technology, the 2.4 GHz and 5 GHz frequency bands are unlicensed spectrums that limited and congested and when running high-bandwidth applications, existing Wi-Fi networks inevitably encounter low quality of service (QOS). More advanced WLAN technology, like the IEEE 802.11be (Wi-Fi® 7) is being developed with higher data rate capability, such as theoretical capacity of up to 30 Gbps (e.g., assuming ideal conditions like clear line-of-sight, single user, and no interference) while 5-10 Gbps is a more realistic expectation in practical scenarios. There are many factors affecting practical capacity, such as signal interference from nearby devices, appliances, and even weather can disrupt signals, reducing throughput. In another example, distance form access point is also another factor where signal strength weakens with distance, impacting achievable speeds. In yet another example, sharing bandwidth among multiple users reduces individual speeds. One of the main objectives of Wi-Fi® 7 is to make full use of up to 1.2 GHz spectrum resources in the 6 GHz band. However, it is increasingly becoming evident that to effectively utilize these frequency resources, Wi-Fi® 7 or more advanced WLAN technologies may have to coexist with other different technologies operating in the same band, such as IEEE 802.11ax (or IEEE 802.11be) and 5G on the unlicensed band. Coexistence among wireless networks is challenging, especially when these networks are heterogeneous. Densely deployed sub-6 or 6-7.125 GHZ WLANs alone may not provide the seamless connectivity required by mobile services and the rapid increase in mobile data traffic in future wireless networks. As a result, one of the main advancements in the network design for WLAN relies on integrating multiple different bands (e.g., microwave and mmWave). Wireless mesh networks (WMNs) are anticipated to resolve the limitations and to significantly improve the performance of ad hoc networks, wireless local area networks (WLANs), wireless personal area networks (WPANs), and wireless metropolitan area networks (WMANs). However, legacy wireless systems face inconsistencies around throughput, resilience, and complexity, where latency and signal noise are other technical problems with existing wireless communication systems and network architecture. Such latency increases when more wireless access points or relay nodes are introduced in the network to extend the communication range. Further, collision avoidance in wireless networks is a significant problem, especially with traditional wireless mesh networks and WLAN systems. Typically, collisions occur when multiple devices attempt to transmit data simultaneously on a shared wireless channel, resulting in corrupted data and reduced network performance.

In contrast to the conventional systems, in the present disclosure, the wireless communication system 100A intelligently balances the simplicity and low latency of analog signal relaying with the flexibility and intelligence of digital processing in a hybrid architecture. This hybrid approach allows to achieve not only the low latency and high efficiency of analog signal relaying but also the flexibility and programmability of digital signal processing. The wireless communication system 100A of the present disclosure not only improves data transfer rates between at least two communication devices as compared to existing wireless systems (e.g. conventional wireless local area networks (WLANs), Wi-Fi® systems, or traditional Wi-Fi® mesh networks) but also enables almost near zero latency communication with significantly reduced interference, almost zero-collision and an always-connected experience.

In operation, the master WAP device 104A may be configured to communicate a wireless local area network (WLAN) signal in a first WLAN frequency from the data source 112. In an implementation, the first WLAN frequency may be in a range of 6-9 GHz. In such implementation, the master WAP device 104A may comprise a WLAN adaptor or a wireless transceiver that supports Wi-Fi® 7 or 8 and may be backward compatible with previous Wi-Fi® frequencies. It is known that Wi-Fi® 7 supports three bands-2.4 GHZ, 5 GHZ, and 6 GHz. In another implementation, the first WLAN frequency may be in a C-band spectrum. In yet another implementation, the first WLAN frequency may a licensed mmWave spectrum of a network operator. In an implementation, the master WAP device 104A may be connected to an optical fiber for the Internet connection or an Ethernet cable for the Internet connection. In such a case, the master WAP device 104A may include an optical fiber port and/or an Ethernet port, or a WLAN Fast Ethernet (FE) port.

The plurality of hybrid analog-digital repeater devices 106 may be disposed at a plurality of different locations. A first hybrid analog-digital repeater device (e.g., the hybrid analog-digital repeater device 106A) may be configured to receive the WLAN signal from the master WAP device 104A. The first hybrid analog-digital repeater device (e.g., the hybrid analog-digital repeater device 106A) may be configured to convert the WLAN signal to a first beam of radio frequency (RF) signal in a intermediate frequency band and may further relay the first beam of RF signals in the intermediate frequency band to one or more second hybrid analog-digital repeater devices (e.g., the hybrid analog-digital repeater devices 106B and 106N) of the plurality of hybrid analog-digital repeater devices 106. The first hybrid analog-digital repeater device (e.g., the hybrid analog-digital repeater device 106A) may be also referred to as a root node that may interface the master WAP device 104A (i.e., the WAP source) and convert the first WLAN signal into intermediate frequency (IF, which may also be referred to as an Internal Frequency) for a beam mesh downstream. Each of the plurality of hybrid analog-digital repeater devices 106 may be equipped with amplifiers (e.g., power amplifiers) and phase shifters (not shown), which enhances the first WLAN signal received from the master WAP device 104A and relay it over longer distances.

The one or more service WAP devices 108 may be configured to receive the first beam of RF signals in the intermediate frequency band (e.g., mm Wave frequency or intermediate frequency in the range of 10-300 GHZ) from the one or more second hybrid analog-digital repeater devices (e.g., the hybrid analog-digital repeater devices 106B and 106N) and convert back to the WLAN signal to serve one or more UEs 110 in a data throughput greater than a threshold throughput. The use of plurality of hybrid analog-digital repeater devices 106 extends the coverage area of the master WAP device 104A and one or more service WAP devices 108, allowing them to serve their corresponding UEs in areas that may have poor signal reception or are located farther away from the master WAP device 104A.

The plurality of hybrid analog-digital repeater devices 106 may be disposed as a radio frequency (RF) bridge between the master WAP device 104A and the one or more service WAP devices 108 such that a data propagation path of user data relayed through a network of the plurality of hybrid analog-digital repeater devices 106 may be analog without any digital decoding or encoding of the user data in the first beam of RF signals to reduce latency less than a threshold time. For example, the data propagation path may comprise high-frequency analog circuitry to minimize latency to nanoseconds. Multi-hop relaying of intermediate frequency signals (e.g., mmWave signals) may happen without any digital encoding or decoding of the user data (i.e., payload). Further, a backchannel connectivity and control of the network of the plurality of hybrid analog-digital repeater devices 106 may be via a second WLAN frequency, based on a signal metadata of the first beam of RF signal. The second WLAN frequency may be less than the first WLAN frequency. While the data propagation path may remain entirely analog for lowest latency, the plurality of hybrid analog-digital repeater devices 106 may extract the signal metadata from RF signals for analysis. This allows deriving wireless metrics like timing parameters, signal quality, interference levels, channel state information, and reference signals using digital signal processing (DSP) techniques. Thus, the simplicity and low latency of analog signal relaying is intelligently combined with the flexibility and intelligence of digital processing in a hybrid architecture.

The plurality of hybrid analog-digital repeater devices 106 may serve as a RF communication bridge between the master WAP device 104A and one or more service WAP devices 108, which allows for the analog relay of user data through a network of the plurality of hybrid analog-digital repeater devices 106. The analog transmission of the user data reduces latency because there is no need for digital encoding and decoding processes, which can introduce delays. By transmitting user data (i.e., payload) in its original analog form, the wireless communication system 100A achieves faster transmission times, making it suitable for applications that require real-time communication, such as data streaming, video streaming, online gaming, and the like. Further, separating the data propagation path and control connectivity ensures that control signals do not interfere with the data transmission path. This separation is beneficial for maintaining the quality of service and preventing degradation of the data transmission path. Further, utilizing parallel channels for control and data connectivity allows for simultaneous communication of control signals and data packets. By operating these channels independently, the wireless communication system 100A prevents congestion and ensures that both control and data traffic receive sufficient bandwidth and priority. This parallel approach enhances network stability and reliability, particularly in environments with high data traffic. Furthermore, intermediate frequencies may be Millimeter-wave (mmWave) signals that operate at higher frequencies than traditional Wi-Fi signals, enabling faster data transfer rates and lower latency. By utilizing intermediate frequencies (e.g., mmWave frequencies or other intermediate frequencies in the range of 10-300 GHz) for analog data transmission between the master WAP device 104A and the one or more service WAP devices 108, the wireless communication system 100A achieves low-latency communication, say microseconds, making it ideal for applications that require rapid response times. Furthermore, lower frequency signals typically have better penetration and coverage, making them suitable for control and coordination purposes. By leveraging lower frequency WLAN signals (e.g., Wi-Fi® signals at 2.4 or 5 GHz) for backchannel communication, a reliable connectivity and coordination among the plurality of hybrid analog-digital repeater devices 106 may be provided. The second WLAN frequency may be in a range of 2.4-5 GHz. Alternatively stated, the intelligent combination of WLAN and mmWave signals enables hybrid coordination, leveraging the strengths of both technologies for optimized network performance. WLAN provides broader coverage and connectivity, while mmWave offers high-speed, low-latency communication. By synergistic integration of the plurality of hybrid analog-digital repeater devices 106 with the modified WAPs (the master WAP device 104A and the one or more service WAP devices 108), the wireless communication system 100A achieves responsive network-wide orchestration, enhancing overall network efficiency and responsiveness.

In accordance with an embodiment, the intermediate frequency band of the first beam of RF signals may be a mmWave frequency in a range of 24-300 GHz or other intermediate frequency in the range of 10-300 GHz. In accordance with an embodiment, first WLAN frequency and the intermediate frequency band of the first beam of RF signals may be one of a licensed mmWave spectrum of a network operator or an unlicensed mmWave spectrum, or a combination thereof. In order to minimize interference, the wireless communication system 100A may be implemented as a wireless mesh network in the licensed mmWave band, where the communication channels may experience reduced interference as the network's resilience against potential disruptions is enhanced caused by interference from other networks. The exclusive use of dedicated frequencies allows for a more robust and interference-free communication infrastructure using a combination of WLAN frequencies and licensed mmWave frequencies contributing to improved network performance and quality of service.

In accordance with an embodiment, each of the master WAP device 104A and the one or more service WAP devices 108 may be configured to perform Multi-User, Multiple Input, Multiple Output (Mu-MIMO) to corresponding connected UEs via corresponding mmWave New Radio Unlicensed (NR-U) links. The use of millimeter-wave frequencies and Mu-MIMO together may provide high data rates and efficient use of the available spectrum. Millimeter-wave frequencies offer increased bandwidth, and Mu-MIMO enhances the overall network capacity by enabling simultaneous communication with multiple user devices. This can result in improved throughput and reduced latency, contributing to a more robust and high-performance wireless communication system, particularly in the context of 5G NR-U deployments.

In an implementation, an initial connection among different network nodes, such as the master WAP device 104A, the plurality of hybrid analog-digital repeater devices 106, and the one or more service WAP devices 108 may be established using second WLAN frequency of an existing WLAN network for a network topology formation, such as a mesh network configuration or a daisy-chain network configuration, and then a dedicated, high-speed data communication may be established within the intermediate frequency band using a directional beam for increased data rates and lower latency among the plurality of hybrid analog-digital repeater devices 106. When there a line-of-sight between two hybrid analog-digital repeater devices, the intermediate frequency employed for node-to-node communication may be in mmWave frequency and when in some scenarios there is a non-line-of-sight between the two two hybrid analog-digital repeater devices, a wired connection may be used for that patch of the network.

In an example, in wireless networking, collision avoidance in wireless networks is a significant problem. Typically, collisions occur when multiple devices attempt to transmit data simultaneously on a shared wireless channel, resulting in corrupted data and reduced network performance. A first conventional and common approach is Carrier Sense Multiple Access with Collision Avoidance (CSMA/CA), where wireless devices listen for other transmissions before sending data. It uses random backoff algorithms to reduce the chance of collisions if multiple devices try to transmit at the same time. A second conventional approach is Clear Channel Assessment (CCA), which verifies if the channel is clear before transmission, using methods like detecting carrier signals or measuring noise levels. A third conventional approach is Request to Send/Clear to Send (RTS/CTS), which involves a handshake between wireless devices, where the sender requests permission to transmit, and the receiver replies if the channel is clear. This is useful for addressing hidden terminals and exposed terminal problems. The "hidden node problem" or "hidden terminal problem" occurs when a node is visible to a wireless access point (WAP), but not to other nodes communicating with that AP. In yet another conventional approach, there is a technique called Multiple Access with Collision Avoidance, where RTS/CTS along with additional mechanisms may be used to avoid collisions in ad-hoc networks. The above conventional techniques, although reduces collision but are known to increase overhead. In the wireless networks, the term "overhead" refers to the resources used for managing, controlling, and signaling information rather than carrying actual user data. Further, traditional wireless backhaul networks have a fixed topology, meaning connections between devices are pre-defined and static.

In contrast to the conventional systems, in accordance with an embodiment, the central cloud server 102 may be configured to orchestrate the plurality of hybrid analog-digital repeater devices 106 to dynamically form a wireless backhaul network topology based on telemetry information received from each of the plurality of hybrid analog-digital repeater devices 106. The wireless backhaul network topology may be one of a wireless backhaul mesh network topology, a wireless-backhaul daisy-chain network topology, or a user-defined wireless backhaul network topology that defines one or more custom combination of the wireless backhaul mesh network topology and the wireless backhaul daisy-chain network topology. In the present disclosure, the wireless communication system 100A may utilize the central cloud server 102 to dynamically adjust the network topology based on real-time or near real time information. The plurality of hybrid analog-digital repeater devices 106 may be configured to dynamically adjust their network topology based on instructions from the central cloud server 102. Further, based on the telemetry information, the central cloud server 102 may be configured to determine how each different types of network node, i.e., the master WAP device 104A, the plurality of hybrid analog-digital repeater devices 106, and the one or more service WAP devices 108 may connect, forming a mesh, daisy-chain, or even a custom hybrid of both. This provides enhanced resilience, where even unforeseen failures in one part of the network may be bypassed by using alternative paths. Furthermore, dynamically forming the wireless backhaul network topology based on telemetry information enables the wireless communication system 100A to implement advanced collision management techniques, such as optimized path selection, real-time collision avoidance, adaptive channel allocation, fault tolerance, and continuous optimization. These capabilities help minimize collisions, improve network efficiency, and enhance reliability and performance.

For example, the central cloud server 102 may be configured to analyze telemetry information from each of the plurality of hybrid analog-digital repeater devices 106 to dynamically select one or more data propagation paths (i.e., optimal data paths) from amongst a plurality of available data propagation paths for data transmission. By considering factors, such as signal strength, interference levels, and network traffic, the central cloud server 102 may be configured to route data along data propagation paths that minimize the risk of collisions and maximize overall network performance. Based on the dynamic adjustment of the network topology in real-time or near real-time, the wireless communication system 100A may be configured to proactively respond to changes in network conditions. If congestion or interference is detected on a particular data propagation path, the central cloud server 102 may be configured to reroute traffic to less congested channels or network nodes, reducing the likelihood of collisions and maintaining consistent multi-gigabit data transmission rates. Further, based on dynamic forming and adjusting of the wireless backhaul network topology, the wireless communication system 100A may be configured to adaptively allocate mmWave channels or other intermediate frequency channels for communication between the plurality of hybrid analog-digital repeater devices 106. The central cloud server 102 may be further configured to monitor telemetry information and adjust the network topology, accordingly, enabling adaptation to changing environmental conditions and network dynamics, ensuring efficient collision avoidance and maximizing network performance.

In accordance with an embodiment, the telemetry information comprises a unique identifier (ID) of each of the plurality of hybrid analog-digital repeater devices 106, a geo-location of each of the plurality of hybrid analog-digital repeater devices 106, an operational state of the plurality of hybrid analog-digital repeater devices 106, and the signal metadata. The operational state of each of the plurality of hybrid analog-digital repeater devices 106 may indicate its status and functionality within the network. This information includes whether each hybrid analog-digital repeater device is active, inactive, undergoing maintenance, or experiencing issues. By monitoring the operational state of each of the plurality of hybrid analog-digital repeater devices 106, the central cloud server 102 may be further configured to identify potential problems or a failure point in the network and take corrective actions, such as rerouting traffic or deploying backup hybrid analog-digital repeater devices, to maintain uninterrupted service and prevent collisions.

In accordance with an embodiment, based on the telemetry information, the central cloud server 102 may cause beam alignment and link optimization among the plurality of hybrid analog-digital repeater devices 106. The beam alignment and link optimization may be understood by taking examples of two hybrid analog-digital repeater devices. The process may begin with the selection of a pair of hybrid analog-digital repeaters to establish a new link connection in the wireless network. Once identified, the first hybrid analog-digital repeater (e.g., the hybrid analog-digital repeater device 106A) may activate a synchronization signal blocks (SSB) generator, which initiates the transmission process. This generator enables the transmission of an SSB signal omni-directionally, incorporating specific link parameters necessary for establishing the upcoming link. On the receiving end, the second hybrid analog-digital repeater device (e.g., the hybrid analog-digital repeater device 106B) may utilize an SSB decoder to scan its surroundings, covering a full 360-degree range, in search of the SSB signal transmitted by the first hybrid analog-digital repeater device. Upon detection of the SSB signal, the second hybrid analog-digital repeater device may lock onto the first SSB signal instance and extract embedded metadata. This metadata may useful information regarding the impending link, including directional cues and transmission parameters. Based on the extracted metadata, the second hybrid analog-digital repeater device (e.g., the hybrid analog-digital repeater device 106B) may proceed to estimate the angle of arrival of the mmWave signal. Based on the determined angle of the arrival, second hybrid analog-digital repeater device (e.g., the hybrid analog-digital repeater device 106B) may activate its beamformer to electronically steer a beam of RF signals towards the direction of the first hybrid analog-digital repeater device. This precise electronic steering ensures the establishment of a directed beam link, enhancing the efficiency and reliability of the connection. Concurrently, the second hybrid analog-digital repeater device (e.g., the hybrid analog-digital repeater device 106B) may provide feedback to the first hybrid analog-digital repeater device, relaying optimal angle and power level recommendations based on its analysis. Upon receiving this feedback, the first hybrid analog-digital repeater device may be configured to adjust its own beamformer settings, aligning its transmission beam with the optimized direction towards the second hybrid analog-digital repeater device. Both repeaters may engage in continuous optimization, dynamically adjusting beam alignment and power levels to maintain peak performance and mitigate potential signal degradation. The central cloud server 102 may be configured to establish a feedback loop with the plurality of hybrid analog-digital repeater devices 106 by exchanging information on link performance and network status. This feedback loop enables the central cloud server 102 to fine-tune coordination strategies based on real-world performance metrics, further enhancing network efficiency and reliability. Further, to facilitate coordinated transmission, Time-Division Duplex (TDD) synchronization may be activated, ensuring efficient time slot coordination between the plurality of hybrid analog-digital repeater devices 106. repeaters. Once testing confirms successful link establishment and optimization, the directed beam link between the plurality of hybrid analog-digital repeater devices 106 may be fully operational, contributing to the overall efficiency and performance of the wireless network.

In accordance with an embodiment, the central cloud server 102 may be further configured to control the network of the plurality of hybrid analog-digital repeater devices 106 to schedule transmit and receive time slot assignments to a plurality of access point devices and the one or more UEs 110 over the backchannel connectivity, wherein the plurality of access point devices comprises the master WAP device 104A and the one or more service WAP devices 108. The master WAP device 104A and the one or more service WAP devices 108 may directly communicate with the one or more UEs 110 to provide wireless connectivity to the one or more UEs 110. The central cloud server 102 may act as a centralized scheduler that may schedule transmit and receive time slot assignments to the plurality of access points (e.g., the master WAP device 104A and the one or more service WAP devices 108) and the one or more UEs 110 over the backchannel connectivity, for example, over the second WLAN signal (e.g., lower Wi-Fi® frequencies such as 2.4 GHz or 5 GHz frequency). Such scheduling maximizes interference-free concurrent downlink and uplink capacity allocation adapting to traffic demand dynamically. This interference mitigation may be useful to ensure reliable and efficient communication, particularly in scenarios where multiple UEs, such as the one or more UEs 110 or client devices share the same frequency spectrum, for example, 6-9 GHz frequencies. Further, as the demand for uplink or downlink capacity changes, the central cloud server 102 may be configured to adjust the allocation of the time slots accordingly to the one or more UEs 110, optimizing resource usage and network performance.

In accordance with an embodiment, the central cloud server 102 may be further configured to align radio frames between each pair of the plurality of hybrid analog-digital repeater devices 106 to a common reference time. It is observed that different oscillator clocks in the plurality of hybrid analog-digital repeater devices 106 drift over a period of time. The monitoring process generates a feedback signal that provides information about any discrepancies or drift observed in the timing. This feedback signal is then used to make real-time adjustments to maintain accurate synchronization. Thus, continuous minor timing adjustments may be made over time to maintain perfect beam alignment. Each hybrid analog-digital repeater device of the plurality of hybrid analog-digital repeater devices 106 may be configured to extract the signal metadata, which may include timing information from the synchronization signal blocks (SSB). The central cloud server 102 may enable precise time slot coordination for latency-sensitive applications. In an implementation, the downlink versus uplink slots per frame may be dynamically adjusted based on the timing information. The central cloud server 102 may be configured to cause the plurality of hybrid analog-digital repeater devices 106 to adjust and optimize for higher downlink capacity during peak hours when demand is higher and rebalance to more uplink slots when traffic patterns change.

In accordance with an embodiment, the central cloud server 102 may be configured to cause the master WAP device 104A to arbitrate a seamless handoffs for the one or more UEs 110 roaming across the one or more service WAP devices 108 connected to the one or more second hybrid analog-digital repeater devices (e.g., the hybrid analog-digital repeater devices 106B and 106N). The master WAP device 104A may be connected to the fiber backhaul (i.e., the data source 112), which refers to a high-capacity, fiber-optic communication link. This robust and high-speed backhaul connection ensures efficient data transfer between the master WAP device 104A and the broader network, including the Internet or other network resources, such as an Ethernet. The central cloud server 102 may be configured to cause the master WAP device 104A to arbitrate the seamless handoffs to maintain continuous connectivity for the one or more UEs 110 (e.g., smartphones, laptops) when the one or more UEs 110 transitions between coverage areas served by different service WAPs, such as the one or more service WAP devices 108. The central cloud server 102 may cause the master WAP device 104A to ensure that the handoff is smooth, without disruptions or noticeable drops in connectivity for the roaming users. In an example, when the central cloud server 102 determines that a handover is necessary due to the user's movement (i.e., movement of the one or more UEs 110), it initiates a handover decision, which may include selecting a new beam or a new service WAP device that provides optimal connectivity for the user's current location. As the one or more UEs 110 starts moving, the central cloud server 102 may be configured to track the device's location based on the telemetry data and cause the one or more service WAP devices 108 to adjust the communication beams accordingly. In some implementations, the one or more service WAP devices 108 may be configured to propagate waveforms corresponding to the same SSID (service set identifier). In this case, no SSID handoff is required when one UE transitions from the service WAP device 108A coverage domain onto the service WAP device 108B coverage.

In accordance with an embodiment, the central cloud server 102 may be configured to cause the network of the plurality of hybrid analog-digital repeater devices 106 to change the wireless backhaul network topology based on a change in signal metrics in the telemetry information received from each of the plurality of hybrid analog-digital repeater devices 106. Based on the analysis of the signal metrics in the telemetry information, the central cloud server 102 may be configured to determine one or more network topology adjustments to the wireless backhaul network topology. For example, the central cloud server 102 may be configured to reroute traffic, establish new connections, or modify the configuration of the network of the plurality of hybrid analog-digital repeater devices 106. The central cloud server 102 may communicate specific instructions to specific hybrid analog-digital repeater devices of the plurality of hybrid analog-digital repeater devices 106 to implement dynamic changes in routing paths. This may involve reconfiguring connections between the master WAP device 104A, changing a mesh topology for a new data propagation path, and connection between one of the plurality of hybrid analog-digital repeater devices 106 and one of the service WAP device 108. The central cloud server 102 may ensure that the chosen wireless backhaul network topology maintains low latency, where the user data is relayed from source to destination within a specified threshold time.

In accordance with an embodiment, each of the plurality of hybrid analog-digital repeater devices 106 may be configured to extract the signal metadata by digital signal processing of a portion of the first beam of RF signals without decoding the user data of the first beam of RF signal. The signal metadata comprises two or more of timing information associated with a radio frame of the first beam of RF signal, system information, channel state information, a cell identity (ID), a beam ID, a signal strength, a signal to noise ratio (SNR), an interference level, or other signal quality metrics. The signal metadata may be communicated to the central cloud server 102 as a part of the telemetry information. The processor 102A may be configured to feed the telemetry information to the neural network model 102B for processing and network-wide optimization. The neural network model 102B may process the data to coordinate beam routing in the plurality of hybrid analog-digital repeater devices 106. Based on the signal metadata, such as signal strength, SNR, the interference level, or other signal quality metrics (e.g., Effective Isotropic Radiated Power (EIRP), antenna gain, Free Space Loss, path loss, transmit power, etc.), the processor 102A may be further configured to determine link budget based on transmit and receive characteristics of each of the plurality of hybrid analog-digital repeater devices 106, the one or more master WAP devices 104, and the one or more service WAP devices 108. The processor 102A may be further configured to identify one or more interference zones within the wireless network. In response to identified interference zones, the processor 102A may be further configured to dynamically adjust network parameters, such as frequency channels or transmission power, to mitigate the impact of interference. Further, the processor 102A may be further configured to cause the plurality of hybrid analog-digital repeater devices 106 to configure phase shifters settings, such as phase adjustment values, across the plurality of hybrid analog-digital repeater devices 106 to control the direction of the transmitted beams, allowing for dynamic adjustments to the coverage area or target direction of the signals.

In some implementations, alternatively, the master WAP device 104A may be modified to include a high-gain antenna, such as a phase array antenna to capture a 5G or 6G mmWave cellular signal from a radio access network (RAN) node, such as a base station (e.g., a gNB or a 5G-enabled small cell). In such a case, the 5G or 6G mmWave cellular signal may be modulated in the first WLAN signal (e.g., the Wi-Fi® signal). Alternatively, signals received via the Ethernet port, or the optical port may be upconverted and modulated with the 5G or 6G mmWave cellular signal. In such a case, a mmWave signal is communicated instead of the first WLAN signal.

In traditional Wi-Fi® mesh systems, the main node, often referred to as the primary router or gateway, is a critical component. It serves as the initial access point to the broader internet and orchestrates the network's communication. However, this creates a single point of failure: if the main node fails, the entire network can be compromised. To mitigate this risk, in the present disclosure, the wireless communication system 100A may employ advanced mesh network configurations for dynamic reassignment of network roles and responsibilities.

In accordance with an embodiment, the central cloud server 102 may be further configured to detect an absence of a primary gateway when the master WAP device 104A fails. The central cloud server 102 may be further configured to quickly initiate a protocol to elect a new master node from the existing other master nodes, such as the master WAP device 104B or one of the service WAP nodes, such as the one or more service WAP devices 108. The election criteria may be based on factors like signal strength, a sudden performance drop, node location, user density, and current traffic load. Once a new master node is elected, the central cloud server 102 may redistribute the network load, where the one or more service WAP devices 108 previously connected to the failed node are dynamically reassigned to neighboring nodes. Such reassignment ensures minimal disruption in network connectivity and performance.

Figure 1B:
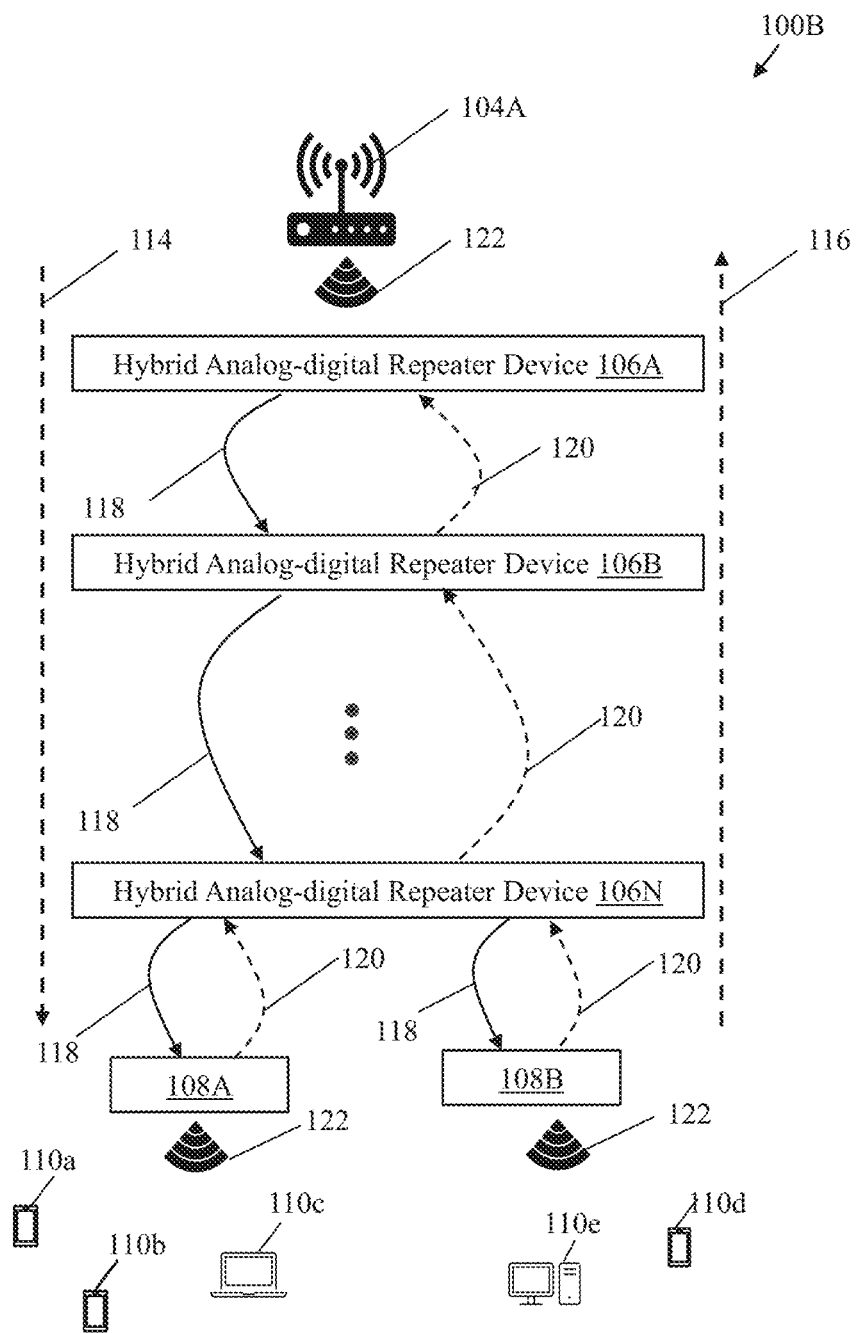
FIG. 1B is a diagram that illustrates an exemplary dual-path routing of user data across a plurality of hybrid analog-digital repeater devices in a wireless communication system, in accordance with an exemplary embodiment of the disclosure.

FIG. 1B is a diagram that illustrates an exemplary dual-path routing of user data across a plurality of hybrid analog-digital repeater devices in a wireless communication system, in accordance with an exemplary embodiment of the disclosure. FIG. 1B is explained in conjunction with elements from FIG. 1A. With reference to FIG. 1B, there is shown a network 100B of the plurality of hybrid analog-digital repeater devices 106, such as the hybrid analog-digital repeater devices 106A, 106B, and 106N.

In accordance with an embodiment, each of the plurality of hybrid analog-digital repeater devices 106 may be configured to execute a differential polarized routing of receive and transmit radio frequency (RF) signals in the intermediate frequency (e.g., millimeter wave frequency) in which a downstream communication 114 and an upstream communication 116 may be performed in a different polarization state (e.g., a vertical polarization and a horizontal polarization) in the network 100B of the plurality of hybrid analog-digital repeater devices 106. The downstream communication 114 may refer one or more communication paths (e.g., one or more data propagation paths) from the one or more master WAP devices 104, such as the master WAP device 104A towards the one or more service WAP devices 108, such as the service WAP device 108A and the service WAP device 108B, via the network 100B of the plurality of hybrid analog-digital repeater devices 106, such as the hybrid analog-digital repeater devices 106A, 106B, and 106N. Further, in the downstream communication 114, the one or more service WAP devices 108 communicates corresponding user data to its corresponding UEs, such as the UEs 110a, 110b, and 110c (connected to the service WAP device 108A) and the UEs 110d and 110e (connected to the service WAP device 108B). In this embodiment, the network 100B of the plurality of hybrid analog-digital repeater devices 106 may be a daisy-chain network. The upstream communication 116 may refer to a communication path from the UEs and the one or more service WAP devices 108 towards the one or more master WAP devices 104, such as the master WAP device 104A via the network 100B of the plurality of hybrid analog-digital repeater devices 106.

In accordance with an embodiment, each of the plurality of hybrid analog-digital repeater devices 106 may be configured to transmit a first beam of RF signals 118 carrying user data in an intermediate frequency band (e.g., mmWave frequency) in a first polarization state towards its neighbouring repeater node, which then amplifies and relays the first beam of RF signals 118 in the intermediate frequency (e.g., mmWave frequency) in the first polarization state in the downstream communication 114. Similarly, for the upstream communication 116, each of the plurality of hybrid analog-digital repeater devices 106 may be configured to transmit a second beam of RF signals 120 carrying user data in the intermediate frequency band in a second polarization state towards its neighboring repeater node, which then amplifies and relays further the second beam of RF signals 120 in the intermediate frequency band in the second polarization state in the upstream communication 116. The first polarization state may be different from the second polarization state. An example of the first and the second polarization state may be a vertical polarization state and a horizontal polarization state. In vertical polarization, the electric field component of the electromagnetic wave (i.e., the mmWave signal) oscillates vertically, meaning it moves up and down concerning the Earth's surface. In horizontal polarization, the electric field component of the electromagnetic wave (i.e., the mmWave signal) oscillates horizontally, moving side to side parallel to the Earth's surface.

The master WAP device 104A may be configured to communicate a wireless local area network (WLAN) signal 122 in a first WLAN frequency (e.g., higher frequency of the Wi-Fi® 6, 7 or 8) from the data source 112. The one or more service WAP devices 108 may be configured to receive the first beam of RF signals 118 in the intermediate frequency band (e.g., mm Wave frequencies or other intermediate frequencies in the range of 10-300 GHZ) from the one or more second hybrid analog-digital repeater devices (e.g., the hybrid analog-digital repeater devices 106N) and convert back to the WLAN signal 122 to serve one or more UEs 110 in a data throughput greater than a threshold throughput. The use of plurality of hybrid analog-digital repeater devices 106 extends the coverage area of the one or more service WAP devices 108, allowing them to serve its corresponding UEs in areas that may have poor signal reception or are located farther away from the master WAP device 104A, without adding to latency due to the one or more analog data propagation paths with dual-polarized signals.

In accordance with an embodiment, the central cloud server 102 may be configured to route data traffic to and from the one or more service WAP devices 108 using two different pairs of dual-polarized signals. Each pair of dual-polarized signals may take a different path through the wireless network, passing through a single chain of the plurality of hybrid analog-digital repeater devices 106 or different chains of hybrid analog-digital repeater devices among the plurality of hybrid analog-digital repeater devices 106. This provides rank-4 connectivity with completely different paths to the one or more service WAP devices 108 (e.g., the service WAP device 108A and the service WAP device 108B), thereby further enhancing resilience against blockages and interference. The rank-4 connectivity indicates multiple independent data streams that can be propagated via the hybrid repeater chains for improved wireless communication performance. For designated wireless links (e.g., certain critical links), the central cloud server 102 may be configured to coordinate between two synchronized service WAP devices, such as the service WAP devices 108A and 108B, to initiate separate streams over different RF chains. The independent streams may then be relayed through completely distinct hybrid repeater chains. This provides path redundancy to counter even simultaneous route disruptions.

In accordance with an embodiment, a donor side of each of the one or more service WAP devices 108 may be modified so that each of the one or more service WAP devices 108 may be configured to communicate with one or more hybrid analog-digital repeater devices over intermediate frequency (e.g., mmWave frequencies or other intermediate frequencies in the range of 10-300 GHz) using high-gain dual polarized antennas. In an implementation, a service side each of the one or more service WAP devices 108 may include a WLAN antenna and may not include a phase array antenna or any high-gain dual polarized antennas. Alternatively, in another implementation, the service side each of the one or more service WAP devices 108 may include a WLAN antenna and a phase array antenna. In such a case, the phase array antenna may be configured to communicate a beam of RF signals to its corresponding UEs or communicate the first WLAN signal at the same time depending on the position of its UE to be served. Alternatively, in another implementation, the service side each of the one or more service WAP devices 108 may include a phase array antenna without WLAN antenna. However, a WLAN adaptor (e.g., 2.4 GHz or 5 Ghz WLAN adaptor) may be provided in all implementations for low-frequency backchannel connectivity for the control channel.

Figure 1C:
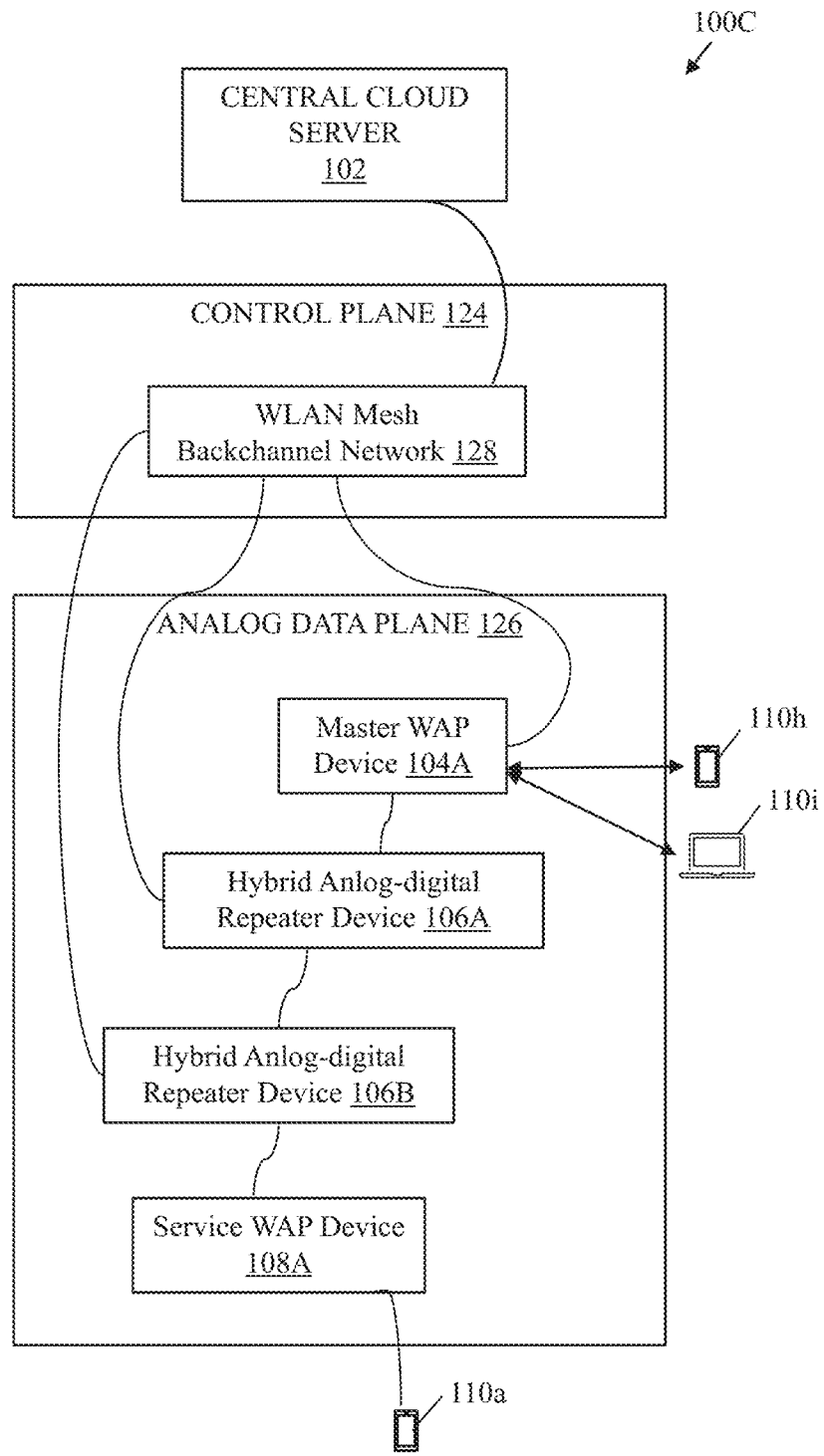
FIG. 1C is a diagram that illustrates an exemplary wireless communication system with a control plane and an analog data plane, in accordance with an exemplary embodiment of the disclosure.

FIG. 1C is a diagram that illustrates an exemplary wireless communication system with a control plane and an analog data plane, in accordance with an exemplary embodiment of the disclosure. FIG. 1C is explained in conjunction with elements from FIGS. 1A and 1B. With reference to FIG. 1C, there is shown a wireless communication system 100C with a control plane 124 and an analog data plane 126.

In accordance with an embodiment, the wireless communication system 100C may employ a software-defined networking (SDN), where the control plane 124 may be separated from the analog data plane 126. In other words, the communication in management mesh for control and remote configuration of each network node is separate and independent from the data network, i.e., analog data plane 126. The data traffic (voice, video, etc.) flows in the data propagation path in analog form through the analog data plane 126, while the control plane 124 (signaling and management) uses a separate digital network, such as the WLAN mesh backchannel network 128 (e.g., may use 2.4 GHz or 5 GHz WLAN frequency). While data traverses the analog network, an out-of-band digital connectivity enables external coordination. The access points, such as the master WAP device 104A and the service WAP device 108A, may include a high bandwidth Wi-Fi® 7 or Wi-Fi® 8 compatible multi-user (MU) MIMO capability to provide wireless connectivity even in non-line-of sight paths. The one or more UEs, such as the UE 110h, the 110i, and the UE 110a may be Wi-Fi® 7 or Wi-Fi® 8 enabled and may connected to the wireless network using corresponding access points, such as the master WAP device 104A and the service WAP device 108A. Each of the master WAP device 104A and the service WAP device 108A may be equipped with multiple antennas to support Multi-User MIMO (MU-MIMO), which allows them to communicate with multiple devices concurrently.

In accordance with an embodiment, the plurality of hybrid analog-digital repeater devices 106, such as the hybrid analog-digital repeater devices 106A and 106B, may be configured to dynamically adjust their network topology based on instructions from the central cloud server 102. Further, based on the telemetry information, the central cloud server 102 may be configured to determine how each different types of network node, i.e., the master WAP device 104A, the plurality of hybrid analog-digital repeater devices 106, and the one or more service WAP devices 108 may connect to each other, forming a mesh, daisy-chain, or even a custom hybrid of both. This provides an enhanced resilience, where even unforeseen failures in one part of the network may be bypassed by using alternative paths. The central cloud server 102 may be configured to generate configuration updates tailored to each node based on its capabilities and context and push these updates to individual nodes using the digital backchannel. Each network node may receive its specific configuration update and applies it within its local area. This enables flexibility and adaptability, as network nodes can adjust their behavior based on local conditions. The local conditions may refer to various factors specific to individual network nodes or their surrounding environment. These factors may influence how the network node operates and how the centralized controller, such as the central cloud server 102 configures each network node. The local conditions may include variations in received signal strength, signal-to-noise ratio, and interference levels within each network node's area, a level of activity on different frequency bands available to each network node, a number and type of devices connected to the network node, movement of users and variation in data usage (e.g., streaming, downloads) within the node's coverage area, different applications bandwidth and latency requirements (e.g., gaming, video conferencing may have varying bandwidth and latency demands), or environmental factors, such as physical obstacles, weather, temperature and humidity. Each of the one or more service WAP devices 108, such as the service WAP device 108A, may utilize a separate repeater chain to avoid relying on a single path, just like couriers taking different roads. This eliminates a single point of failure. Further, multi-source coordinated connectivity provides redundancy against impairments. In other words, by having multiple master WAP devices and service WAP devices send the same user data (data streams), even if one is affected, the others can still deliver the user data to its UE.

In accordance with an embodiment, there may be a test node or a reference node (e.g., UE 110f may be a CPE as a test node), such as a customer premise equipment (CPE) in the wireless communication system 100A or 100C. The test node may be used as an independent reference node to periodically or continuously ascertain network performance characteristics, such as a current SNR, SINR, RSSI, TSSI, a throughput rate when served by one of the network node (one of the service access point devices or the master access point device) in the wireless communication system 100A or 100C. Such network performance characteristics may be reported to the central cloud server 102. The central cloud server 102 may use the information received independently by the test node for another layer of independent performance monitoring of the wireless backhaul network in the wireless communication system 100A or 100C along with the telemetry information received from each network node. In case of detection of any performance drop, the central cloud server 102 may be further configured to detect where is the fault (i.e., identify one or more fault nodes) and accordingly re-configure one or more fault nodes to maintain or optimize the network performance (greater than defined threshold performance, for example, greater than 25 Giga byte per second throughput rate and the like).

Figure 2:
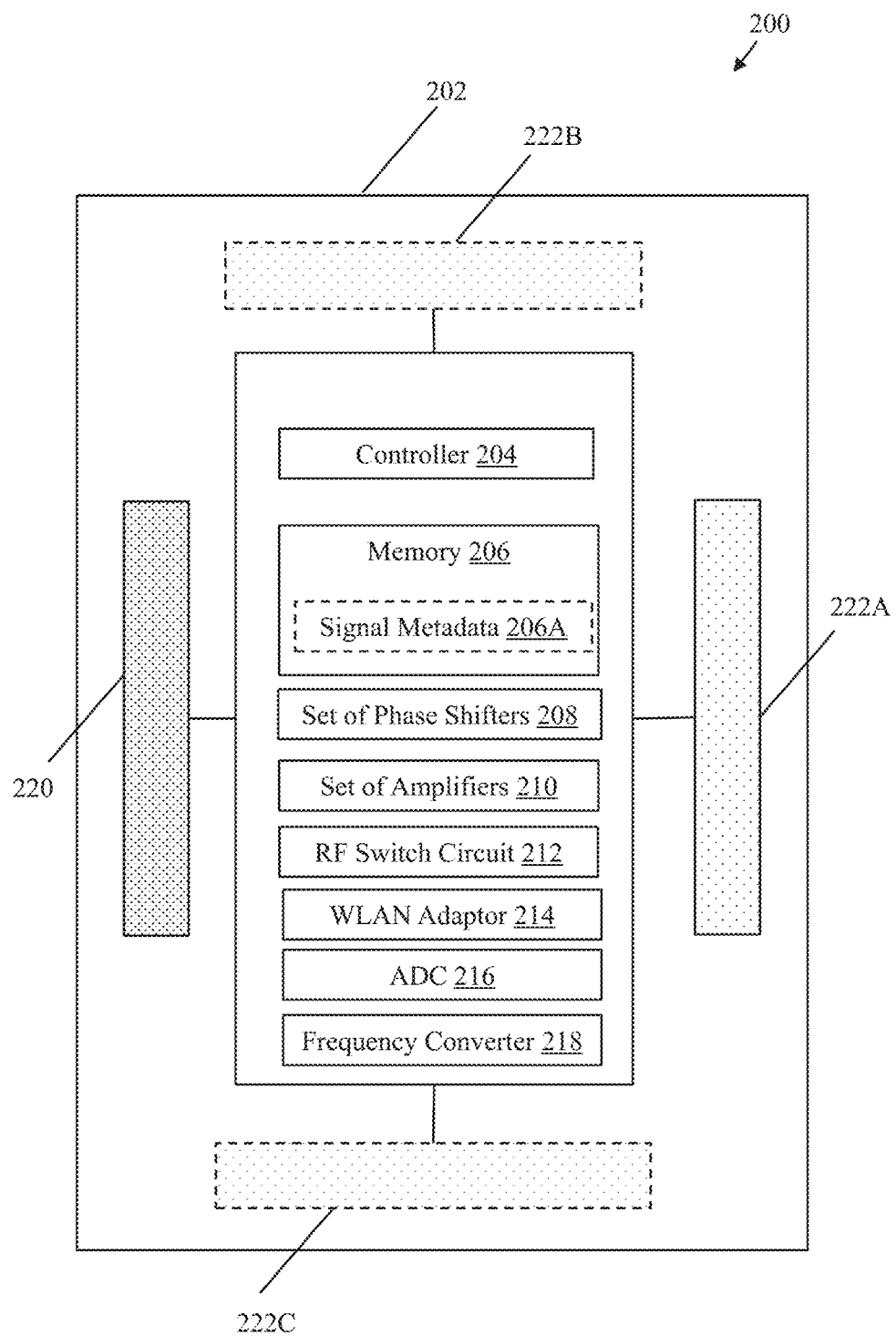
FIG. 2 is a block diagram that illustrates various components of an exemplary hybrid analog-digital repeater device of a wireless communication system, in accordance with an exemplary embodiment of the disclosure.

FIG. 2 is a block diagram that illustrates various components of an exemplary hybrid analog-digital repeater device of a wireless communication system, in accordance with an exemplary embodiment of the disclosure. FIG. 2 is explained in conjunction with elements from FIGS. 1A, 1B and 1C. With reference to FIG. 2, there is shown a block diagram 200 of a hybrid analog-digital repeater device 202. The hybrid analog-digital repeater device 202 may correspond to the plurality of hybrid analog-digital repeater devices 106.

The hybrid analog-digital repeater device 202 may include a controller 204, a memory 206, a set of phase shifters 208, a set of amplifiers 210, a radio frequency (RF) switch circuit 212, a wireless local area network (WLAN) adaptor 214, an analog-to-digital converter (ADC) 216, and a frequency converter 218. The hybrid analog-digital repeater device 202 may further include a donor antenna 220 and one or more service phase antenna array 222A, 222B, and 222C.

The controller 204 may be a Field Programmable Gate Array (FPGA), which may be configured to manage digital functions like telemetry information processing, parameter extraction and control channel interface to the central cloud server 102. The controller 204 may be configured to receive an incoming RF signal relay from an upstream node and relay the incoming RF signal to one or more neighbouring nodes. The controller 204 may be configured to extract the signal metadata 206A by digital signal processing of a portion (e.g., a header portion) of the first beam of RF signals without decoding the user data of the first beam of RF signal.

The memory 206 may include suitable logic, circuitry, and/or interfaces that may be configured to store instructions executable by the controller 204. The memory 206 may temporarily store and update the telemetry information, which may be periodically communicated to the central cloud server 102. Examples of implementation of the memory 206 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. The memory 206 may store the signal metadata 206A.

The set of phase shifters 208 may be configured to perform precise phase control to digitally steer beams in directed orientations based on control instructions received from the central cloud server 102 or one of the network nodes under control of the central cloud server 102.

The set of amplifiers 210 may be configured to provide signal gain to overcome propagation losses and boost SNR to maintain link budgets over multiple hops of relaying, such as across the plurality of hybrid analog-digital repeater devices 106, all the way to the one or more UEs 110. The set of amplifiers 210 may be high-gain amplifiers designed to operate in the intermediate frequency bands (e.g., mmWave frequencies in 24-300 GHz or other intermediate frequencies in the range of 10-300 GHz).

The RF switch circuit 212 may be connected to the set of amplifiers 210. The RF switch circuit 212 may be configured to perform dynamic beam steering by switching between different service phase antenna arrays, such as the one or more service phase antenna array 222A, 222B, and 222C to route RF signals along different directions as required. This enables adaptable signal propagation, responding to changing network conditions and optimizing communication paths for improved reliability and performance. This dynamic beam steering capability is particularly beneficial in scenarios where the environment or network conditions may vary, allowing the wireless communication system 100A or 100C to adapt and maintain efficient signal transmission.

The WLAN adaptor 214 may be configured to handle lower WLAN frequencies (e.g., 2.4 GHz or 5 GHz in Wi-Fi® 7 or 8) to establish a backchannel communication link. This may be used for various purposes, including management and coordination between devices in a wireless network. The WLAN adaptor 214 may be configured to provide a backchannel connectivity and control of the network of the plurality of hybrid analog-digital repeater devices 106 via a second WLAN frequency, based on the signal metadata 206A of the first beam of RF signal.

The ADC 216 may be configured to convert a header portion of a RF signal (in intermediate frequency or WLAN frequency) from analog to digital domain. While the data path remains entirely analog for lowest latency, each of the plurality of hybrid analog-digital repeater devices 106, such as the hybrid analog-digital repeater device 202 may extract the signal metadata 206A from RF signals for analysis. This allows deriving wireless metrics like timing parameters, signal quality, interference levels, channel state information, and reference signals using DSP techniques.

The frequency converter 218 may be configured to upconvert or down convert one radio frequency to another radio frequency of an RF signal. For example, the hybrid analog-digital repeater device 202 may utilize the frequency converter 218 to convert a WLAN signal to a beam of RF signals in an intermediate frequency band (e.g., mmWave frequencies or other intermediate frequencies in the range of 10-300 GHz). The frequency converter 218 may perform frequency up conversion by frequency mixing of the WLAN signal with a local oscillator signal, generating an intermediate frequency (e.g., mmWave frequencies or other intermediate frequencies in the range of 10-300 GHz) for improved wireless communication performance. In some embodiments, the frequency converter 218 may include a phased locked loop (PLL) circuit, which acts as a local oscillator.

The donor antenna 220 may be communicatively coupled to a cascading receiver chain comprising various components (e.g., a set of low noise amplifiers (LNA), a set of receiver front end phase shifters, and a set of power combiners) for the signal reception (not shown for brevity). The donor antenna 220 may be configured to receive an incoming RF signal from an upstream node. The donor antenna 220 may be an WLAN antenna or a phase array antenna, such as a dual-polarized antenna.

The one or more service phase antenna array 222A, 222B, and 222C may be configured to relay a beam of RF signals to one or more neighboring downstream nodes. Each of the one or more service phase antenna array 222A, 222B, and 222C may be dual-polarized antennas, where separate antenna arrays may be used for horizontal and vertical polarizations allowing polarization diversity mechanisms. Each of the plurality of hybrid analog-digital repeater devices 106 (such as the hybrid analog-digital repeater device 202) may include multiple phased array antennas (e.g., the one or more service phase antenna array 222A, 222B, and 222C) with electrically steerable directive beams to focus signals along narrow beams. The phase antenna arrays may include individual phase shifters and amplifiers behind each radiating element to shape and control the beam pattern digitally.

Figure 3:
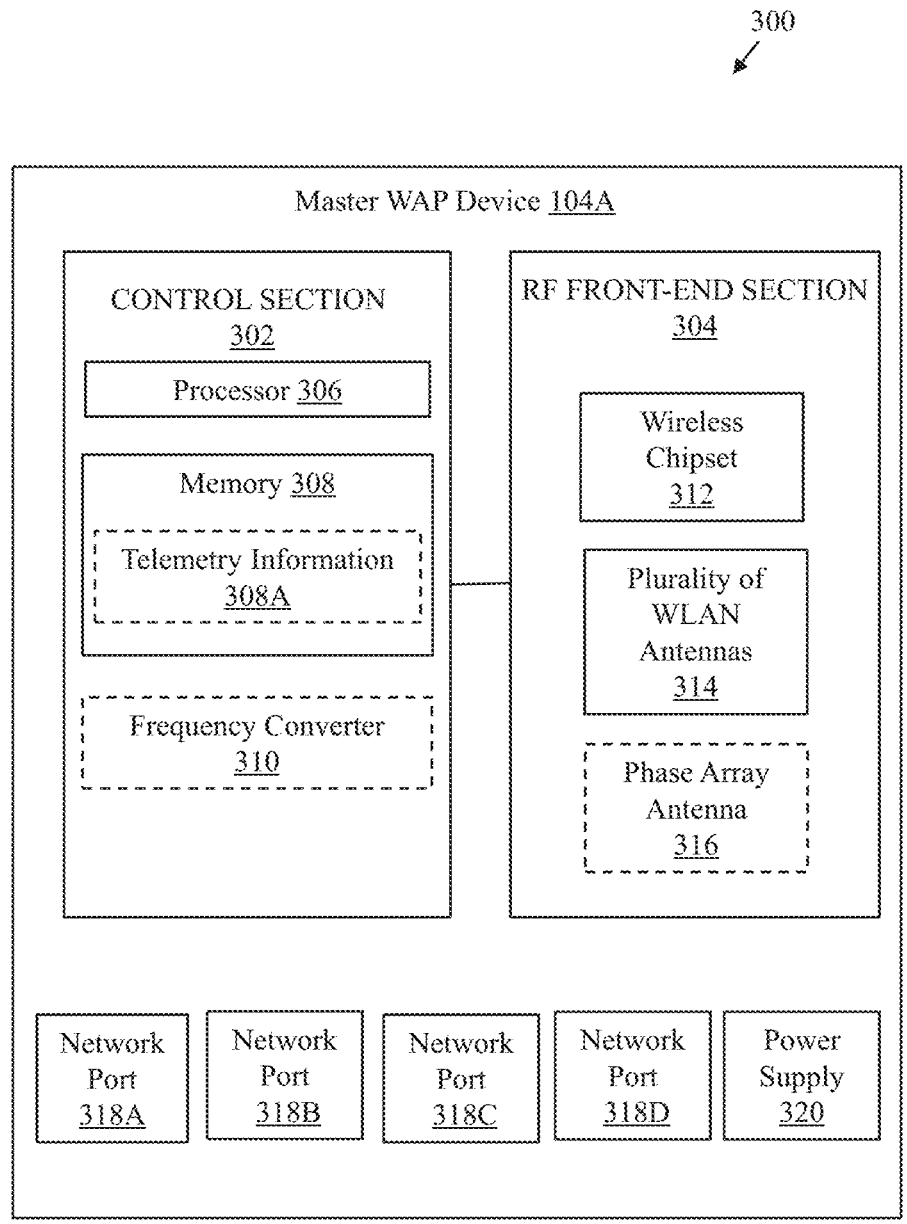
FIG. 3 is a block diagram that illustrates various components of an exemplary master wireless access point (WAP) device of a wireless communication system, in accordance with an exemplary embodiment of the disclosure.

FIG. 3 is a block diagram that illustrates various components of an exemplary master wireless access point (WAP) device of a wireless communication system, in accordance with an exemplary embodiment of the disclosure. FIG. 3 is explained in conjunction with elements from FIGS. 1A, 1B, 1C, and 2. With reference to FIG. 3, there is shown a block diagram 300 of the master WAP device 104A. The master WAP device 104A may correspond to the one or more master WAP devices 104 (FIG. 1A). The master WAP device 104A may include a control section 302 and a front-end RF section 304. The control section 302 may include a processor 306 and a memory 308, which may include the telemetry information 308A. In an implementation, the control section 302 may include a frequency converter 310. In some implementations, the frequency converter 310 may not be provided. The front-end RF section 304 may include a wireless chipset 312 and a plurality of WLAN antennas 314. In some implementations, the master WAP device 104A may be modified to further include a high-gain dual polarized antenna, such the phase array antenna 316. The master WAP device 104A may include a plurality of network ports, such as network ports 318A to 318D, and a power supply 320. The processor 306 may be communicatively coupled to the memory 308, the frequency converter 310 (when provided), and the different components of the front-end RF section 304 and the master WAP device 104A.

The processor 306 may be configured to communicate a wireless local area network (WLAN) signal in a first WLAN frequency from the data source 112. The processor 306 may be responsible for overall processing tasks, routing data and managing network operations and receiving instructions from the central cloud server 102. The processor 306 may be a multi-core processor to handle the increased demands of Wi-Fi® 7 or 8, beamforming, and Mu-MIMO.

The memory 308 may include the telemetry information 308A. The telemetry information 308A may comprise a unique identifier (ID) of the master WAP device 104A, its geo-location, an operational state of the master WAP device 104A, and the signal metadata of WLAN signals or mmWave signals communicated by the master WAP device 104A. The memory 308 may further store temporary data and processing buffers to maintain smooth network performance. Examples of the implementation of the memory 308 may be similar to that of the memory 206 of FIG. 2.

The frequency converter 310 may be present when a functionality of the root node (one of the hybrid analog-digital repeater device) is implemented in the master WAP device 104A. When present, the frequency converter 310 may be used to up convert or down convert frequencies.

The wireless chipset 312 may be a hardware component responsible for transmitting and receiving WLAN (Wi-Fi®) signals, supporting multiple frequency bands (e.g., 2.4 GHz, 5 GHZ, and 6 GHz bands or 6-9 GHz bands), and processing radio signals, such as modulation, demodulation, filtering, and amplification to ensure seamless communication with the one or more Wi-Fi® enabled UEs 110. The wireless chipset 312 may include radio elements that may convert digital data into radio waves for transmission and vice versa.

The plurality of WLAN antennas 314 may be configured to transmit and receive WLAN (Wi-Fi®) signals. The plurality of WLAN antennas 314 may be in MIMO configuration for performing MU-MIMO and beamforming to enhance coverage and signal strength, for the one or more UEs 110. The number of antennas in the MIMO configuration may vary depending on use case (e.g., consumer grade or enterprise grade), for example 2×2, 4×4 or 8×8 MIMO configurations may be provided.

In some implementations, alternatively, the master WAP device 104A may be modified to include one or more high-gain antennas, such as the phase array antenna 316 to capture a 5G or 6G mmWave cellular signal from a radio access network (RAN) node (e.g., a gNB or a 5G or 6G small cell) and/or to relay a mmWave signal to one or more hybrid analog-digital repeater devices of the plurality of hybrid analog-digital repeater devices 106.

The network port 318A may be an optical fiber port. The network port 318B may be an Ethernet port. The network port 318C may be a WLAN Fast Ethernet (FE) port. The network port 318D may be an USB port. The power supply 320 may be configured to provide power to the various components of the master WAP device 104A.

Figure 4:
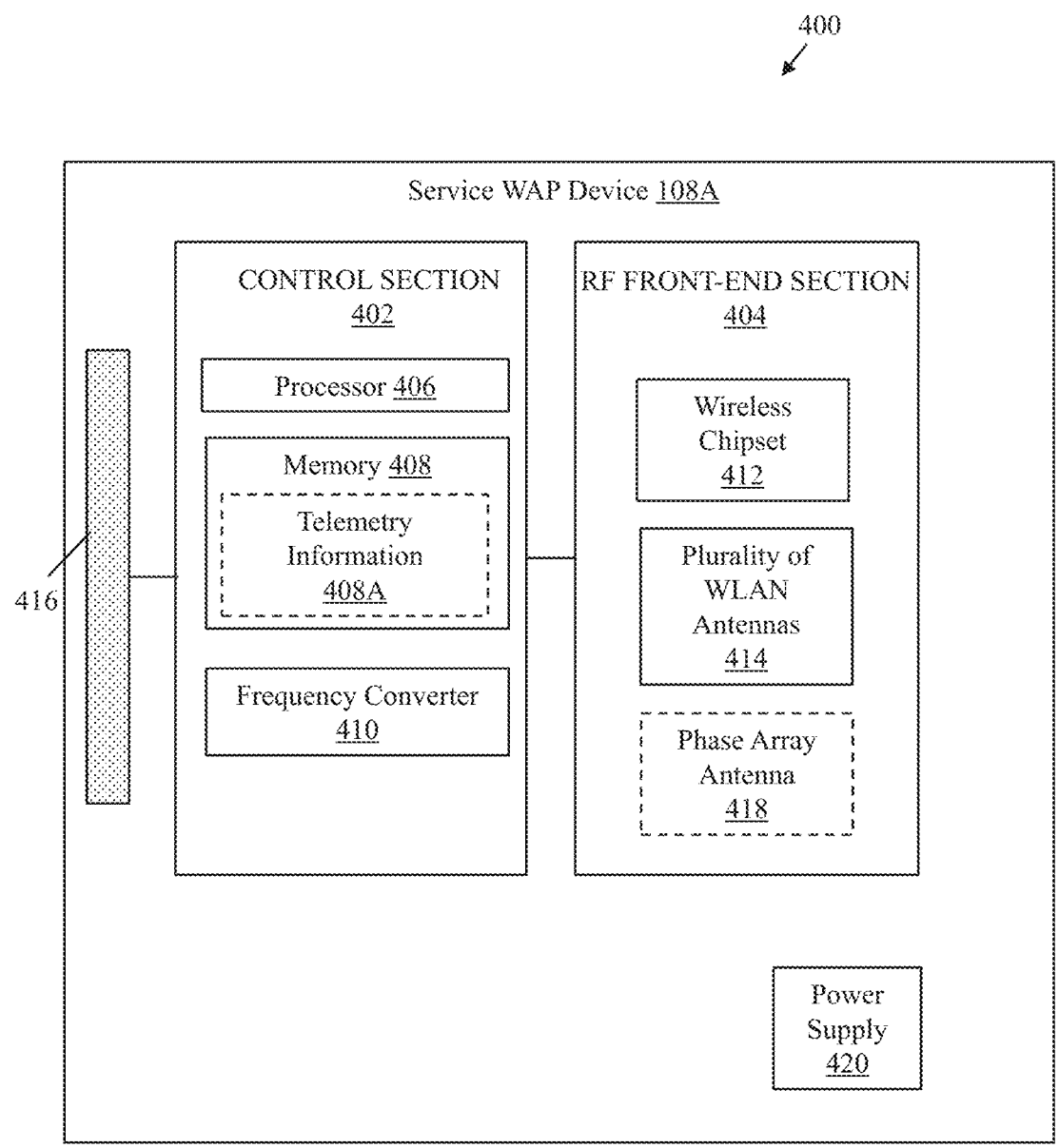
FIG. 4 is a block diagram that illustrates various components of an exemplary service WAP device of a wireless communication system, in accordance with an exemplary embodiment of the disclosure.

FIG. 4 is a block diagram that illustrates various components of an exemplary service WAP device of a wireless communication system, in accordance with an exemplary embodiment of the disclosure. FIG. 4 is explained in conjunction with elements from FIGS. 1A, 1B, 1C, 2, and 3. With reference to FIG. 4, there is shown a block diagram 400 of the service WAP device 108A. The service WAP device 108A may correspond to the one or more service WAP devices 108 (FIG. 1A). The service WAP device 108A may include a control section 402 and a front-end RF section 404. The control section 402 may include a processor 406 and a memory 408 (with telemetry information 408A), and a frequency converter 410. The front-end RF section 404 may include a wireless chipset 412, a plurality of WLAN antennas 414. In some implementations, the service WAP device 108A may be modified to further include a high-gain dual polarized antenna, such the phase array antenna 416 at a donor side connected to a donor port. In an implementation, the service side may have the plurality of WLAN antennas 414. In another implementation, the service side may include another high-gain antenna, such as a phase array antenna 418 along with the plurality of WLAN antennas 414. In some implementations, the network ports for wired communication may not be provided as it primarily interfaces with wireless WLAN devices. However, in some cases, the network ports like the master WAP device 104A may be provided. The processor 406 may be communicatively coupled to the memory 408, the frequency converter 410 and the different components of the front-end RF section 404. The service WAP device 108A may further include a power supply 420 to provide power to the various components of the service WAP device 108A.

The processor 406 may be configured to receive a first beam of RF signals in the intermediate frequency band (e.g., mmWave frequencies or other intermediate frequencies in the range of 10-300 GHz) from the one or more second hybrid analog-digital repeater devices (e.g., one or more of the hybrid analog-digital repeater devices 106B to 106N) and convert back to the WLAN signal to serve one or more UEs 110 in a data throughput greater than a threshold throughput (e.g., 30-100 Gbps).

The memory 408 may include the telemetry information 408A. The telemetry information 408A may comprise a unique identifier (ID) of the service WAP device 108A, its geo-location, an operational state of the service WAP device 108A, and the signal metadata of WLAN signals or mm Wave signals received/transmitted by the service WAP device 108A. Examples of the implementation of the memory 408 may be similar to that of the memory 206 of FIG. 2.

The frequency converter 410 may be used to convert the first beam of RF signals in the intermediate frequency band to the first WLAN frequency (e.g., within 6-9 GHZ). In some cases, the intermediate frequency may be converted to another intermediate frequency for wide beam relay. Examples of implementation of the wireless chipset 412, the plurality of WLAN antennas 414, the phase array antennas 416 and 418 may be similar to that of the master WAP device 104A of FIG. 3.

Figure 5:
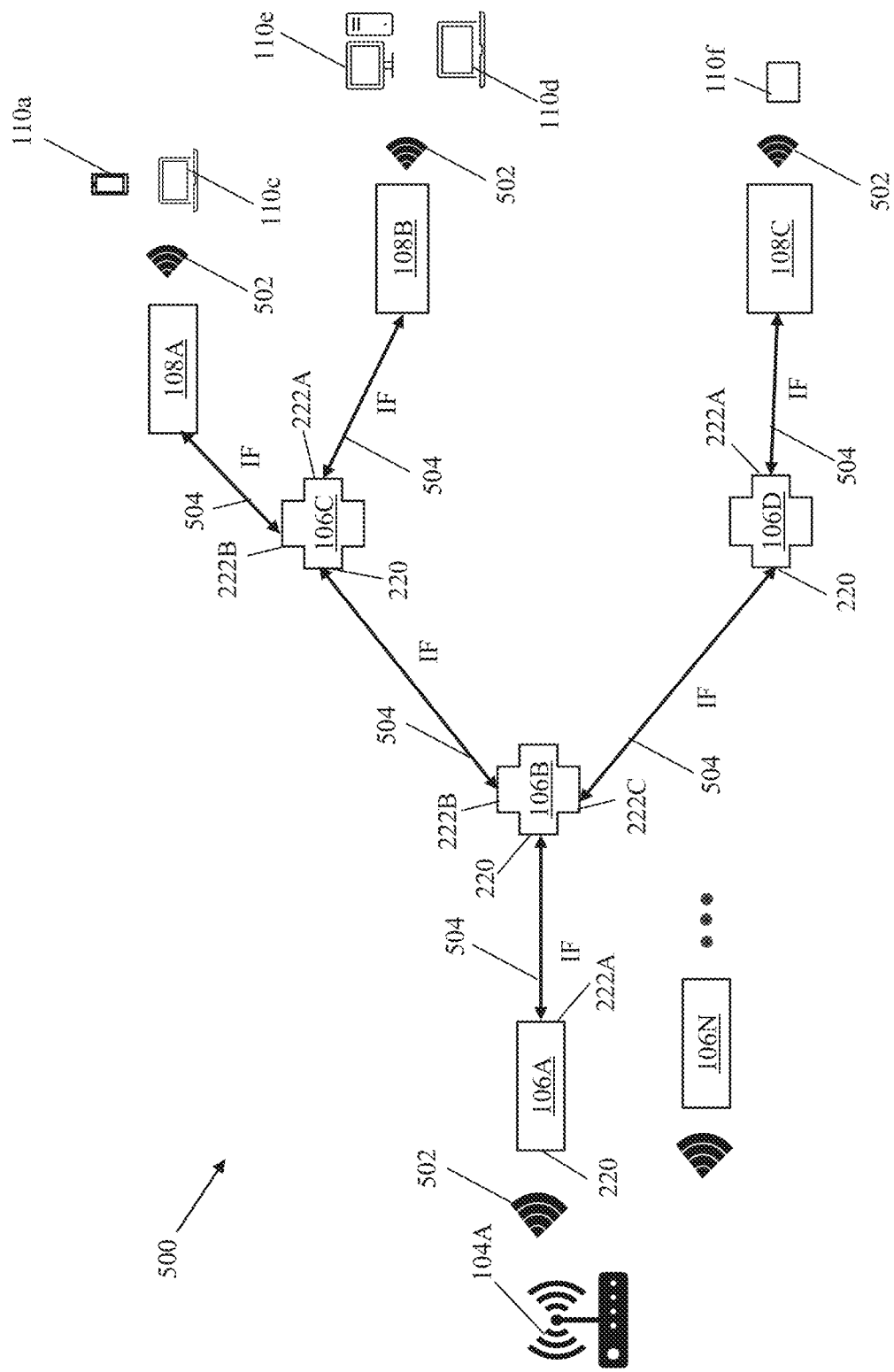
FIG. 5 is a diagram that illustrates an exemplary implementation of a wireless communication system with integrated hybrid analog-digital repeater devices, in accordance with an exemplary embodiment of the disclosure.

FIG. 5 is a diagram that illustrates an exemplary implementation of a wireless communication system with integrated hybrid analog-digital repeater devices, in accordance with an exemplary embodiment of the disclosure. FIG. 5 is explained in conjunction with elements from FIGS. 1A, 1B, 1C, 2, 3, and 4. With reference to FIG. 5, there is shown an exemplary wireless communication system 500 that includes the master WAP device 104A, a wireless backhauls mesh network of the hybrid analog-digital repeater devices 106A, 106B, 106D, and 106N, and the service WAP devices 108A, 108B, and 108C.

In operation, the master WAP device 104A may be configured to communicate a WLAN signal 502 in a first WLAN frequency from the data source 112. In an implementation, the first WLAN frequency may be in a range of 6-9 GHZ (e.g., Wi-Fi® 6, 7, 8). The master WAP device 104A may be at a first location. The plurality of hybrid analog-digital repeater devices 106 may be disposed at a plurality of different locations. The hybrid analog-digital repeater device 106A may be configured to receive the WLAN signal 502 from the master WAP device 104A via the donor antenna 220 (which may be a WLAN antenna or a phase array antenna connected to a WLAN Fast Ethernet (FE) port. The hybrid analog-digital repeater device 106A may utilize the frequency converter 218 to convert the WLAN signal 502 to a beam of RF signals 504 in an intermediate frequency band (e.g., mmWave frequencies or other intermediate frequencies in the range of 10-300 GHZ). The frequency converter 218 may perform frequency up conversion by frequency mixing of the WLAN signal 502 with a local oscillator signal, generating an intermediate frequency for improved wireless communication performance. The beam of RF signals 504 in the intermediate frequency band may be a mm Wave frequency in a range of 10-300 GHz or other intermediate frequency in a range of 10-300 GHz. The intermediate frequency band of the first beam of RF signals 504 may be a licensed mmWave spectrum of a network operator or an unlicensed mmWave spectrum. The hybrid analog-digital repeater device 106A may be a root node that may then relay the beam of RF signals 504 in the intermediate frequency band to one or more second hybrid analog-digital repeater devices (e.g., the hybrid analog-digital repeater devices 106B and 106N) of the plurality of hybrid analog-digital repeater devices 106.

In this case, the beam of RF signals 504 may be relayed to the hybrid analog-digital repeater device 106B. The hybrid analog-digital repeater device 106B may be configured as a switch node that may receive the incoming beam of mm Wave signal (i.e., the beam of RF signals 504) via the donor antenna 220 from a first direction from the upstream node (i.e., the hybrid analog-digital repeater device 106A). In the switch node configuration, the donor antenna 220 may be implemented as a phase array antenna configured to receive a narrow beam, i.e., the beam of RF signals 504 via the donor antenna 220 and concurrently route the beam of RF signals 504 two or more downstream nodes in two or more different directions. In this case, the RF switch circuit 212 (of FIG. 2) may be configured to switch the beam of RF signals 504 to the two service phase antenna arrays 222B and 222C of the hybrid analog-digital repeater device 106B to concurrently route two parallel beams of RF signals 504 to two downstream nodes (e.g., the hybrid analog-digital repeater devices 106C and 106D) in two different directions. The two service phase antenna arrays 222B and 222C may be arranged at different positions and orientations with respect to each other and with respect to the donor antenna 220. In other words, one or more of the plurality of hybrid analog-digital repeater devices 106 may be configured to concurrently route an incoming beam of RF signal in the intermediate frequency (e.g., mmWave signal) received from an upstream node in a first direction to two or more downstream nodes in two or more different directions. Each of the plurality of hybrid analog-digital repeater devices 106 may be equipped with the set of amplifiers 210 (e.g., power amplifiers) and the set of phase shifters 208, which enhances the mmWave signal and relays across the hybrid analog-digital repeater devices 106A, 106B, 106C, and 106D over longer distances.

The service WAP devices 108A may be configured to receive, via the phase array antenna 416, the first beam of RF signals 504 in the intermediate frequency band from the service phase antenna array 222B of the hybrid analog-digital repeater devices 106C and convert the first beam of RF signals 504 back to the WLAN signal 502 in the first WLAN frequency (e.g., Wi-Fi® 6, 7, or 8., i.e., within 6-9 GHz frequency range) using the frequency converter 410. The frequency converter 410 may be used to down convert the first beam of RF signals 504 in the intermediate frequency band to the first WLAN frequency to serve to its connected UEs 110a and 110c in a data throughput greater than a threshold throughput, for example, in multi-gigabit data rate. Similarly, the service WAP devices 108B may be configured to receive the first beam of RF signals 504 in the intermediate frequency band from the service phase antenna array 222A of the hybrid analog-digital repeater devices 106C and convert the first beam of RF signals 504 back to the WLAN signal 502 in the first WLAN frequency (e.g., Wi-Fi® 6, 7, or 8., i.e., within 6-9 GHz frequency range) to serve to its connected UEs 110d and 110e. The service WAP devices 108C may be configured to receive the first beam of RF signals 504 in the intermediate frequency band from the service phase antenna array 222A of the hybrid analog-digital repeater devices 106D and convert the first beam of RF signals 504 back to the WLAN signal 502 in the first WLAN frequency (e.g., Wi-Fi® 6, 7, or 8., i.e., within 6-9 GHz frequency range) to serve to its connected UE 110f (e.g., a client device, smart TV, or a CPE). The hybrid analog-digital repeater devices 106A to 106D extends the coverage area of the master WAP device 104A and the one or more service WAP devices 108, with a negligible latency even through user data passes through multiple hops. The hybrid analog-digital repeater devices 106A to 106D may be disposed as a radio frequency (RF) bridge between the master WAP device 104A and the service WAP devices 108A, 108B, and 108C such that a data propagation path of user data relayed through a network of the hybrid analog-digital repeater devices 106A to 106D may be analog without any digital decoding or encoding of the user data in the first beam of RF signals 504 to reduce latency less than a threshold time, in the order of nanoseconds. Further, a backchannel connectivity and control of the network of the hybrid analog-digital repeater devices 106A to 106D may be via a second WLAN frequency (e.g., 2.4 GHz or 5 GHZ) frequency. The backchannel connectivity and control of the network of the hybrid analog-digital repeater devices 106A to 106D may be based on the signal metadata 206A of the first beam of RF signals 504. The second WLAN frequency may be less than the first WLAN frequency. In the upstream communication 116, the service WAP devices 108A, 108B, and 108C may be configured to acquire RF signals from its corresponding UEs and pack the user data back to the master WAP device 104A via the hybrid analog-digital repeater devices 106A to 106D.

In an exemplary implementation, data streams/RF signals received by the service WAP devices 108A, 108B, and 108C from one or more UEs during the upstream communication 116 to the master WAP device 104A may have very different relative signals levels. Aggregating these received signals next to each other in the frequency domain may degrade the signal quality of weaker signals, due to leakage of out-of-band emissions of comparatively stronger signals. To address this issue, some relative gain equalization may be applied at the service WAP devices 108A, 108B, and 108C before aggregating the RF signals from the UEs and sending them up upstream towards the master WAP device 104A via one or more hybrid analog-digital repeater devices. In some embodiments, the relative gain values may be coordinated, or shared with, or may be set by the central cloud server 102. This enables MIMO pre-coding or decoding to take into account such gain adjustment in their MIMO processing.

Figure 6A:
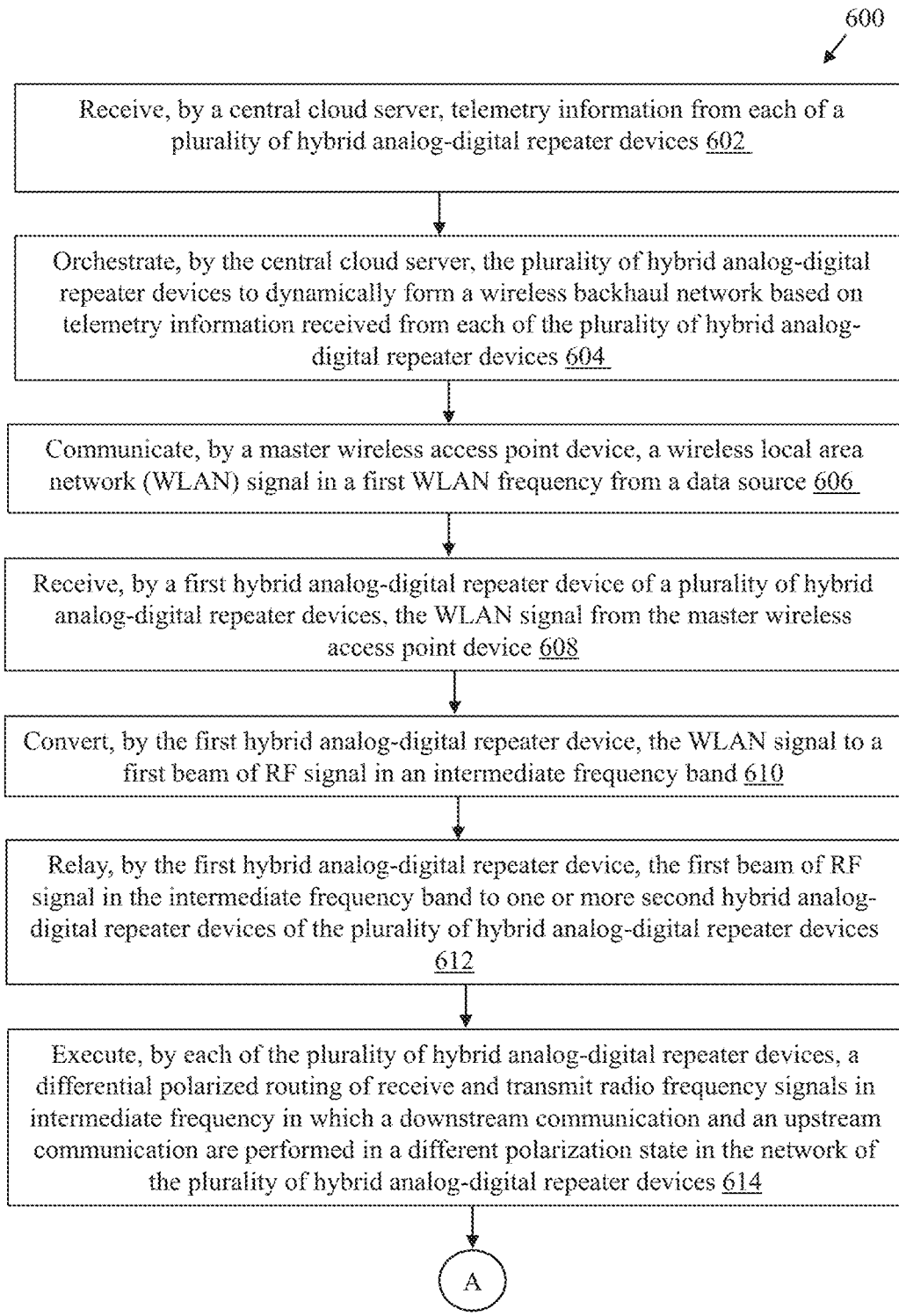
FIG. 6A and FIG. 6B, collectively, is a flowchart of a wireless communication method for high-performance, low latency fixed wireless access using hybrid repeater devices, in accordance with an embodiment of the disclosure.
Figure 6B:
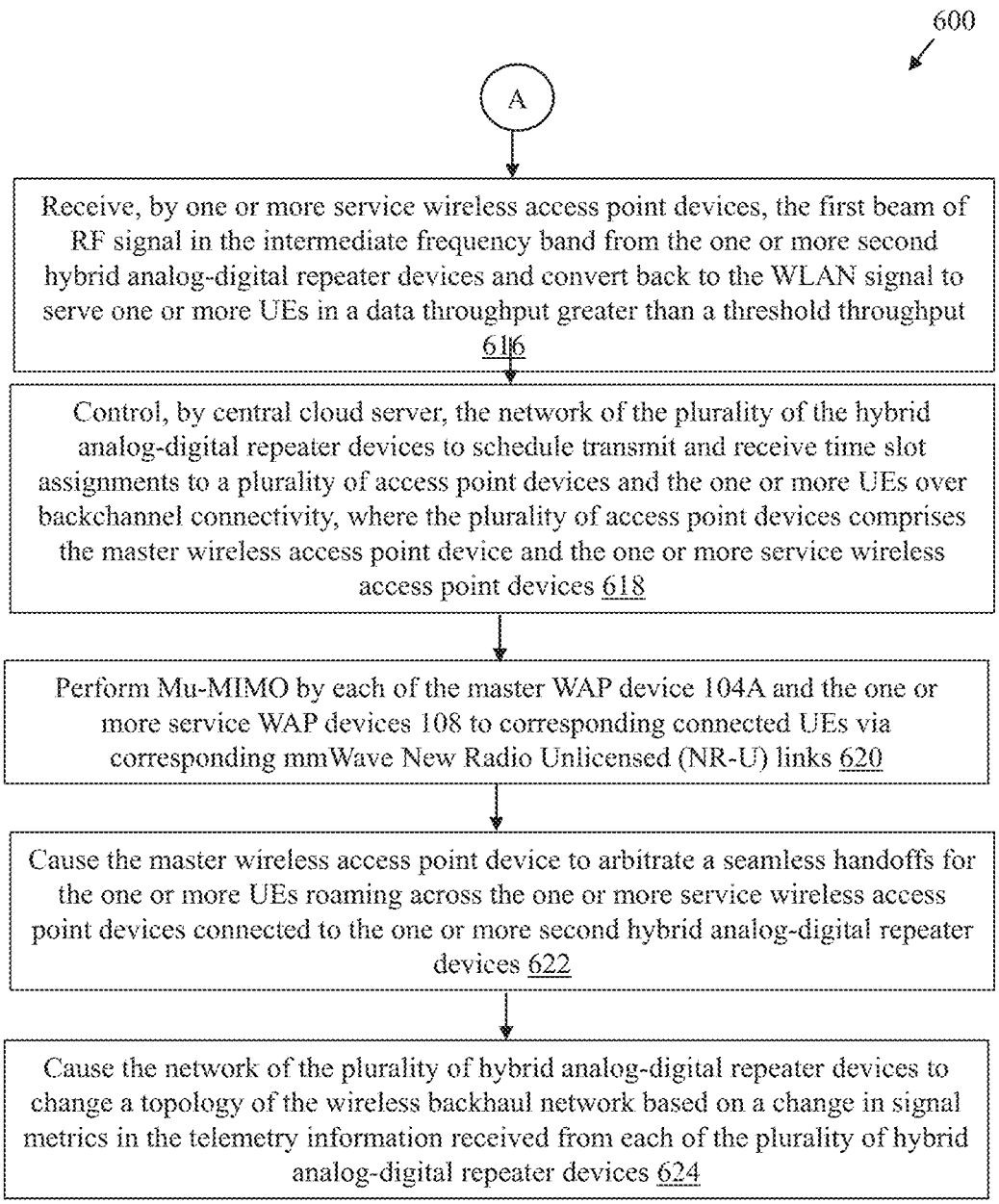

FIG. 6A and FIG. 6B, collectively, is a flowchart of a wireless communication method for high-performance, low latency fixed wireless access using hybrid repeater devices, in accordance with an embodiment of the disclosure. FIGS. 6A and 6B are explained in conjunction with elements from FIGS. 1A, 1B, IC, 2, 3, 4, and 5. With reference to FIGS. 6A and 6B, there is shown a flowchart of a method 600 comprising exemplary operations 602 through 624. The method 600 may be implemented in the wireless communication system 100A, 100C, and 500.

At 602, telemetry information may be received by the central cloud server 102 from each of the plurality of hybrid analog-digital repeater devices 106. The plurality of hybrid analog-digital repeater devices 106 may be disposed at a plurality of different locations.

At 604, the plurality of hybrid analog-digital repeater devices 106 may be orchestrated by the central cloud server 102 to dynamically form a wireless backhaul network based on the telemetry information received from each of the plurality of hybrid analog-digital repeater devices 106. The wireless backhaul network may be one of a wireless backhaul mesh network, a wireless backhaul daisy-chain network, or a user-defined wireless backhaul network topology that defines one or more custom combination of the wireless backhaul mesh network and the wireless backhaul daisy-chain network.

At 606, the wireless local area network (WLAN) signal 502 may be communicated by the master WAP device 104A in a first WLAN frequency from the data source 112.

At 608, the WLAN signal 502 may be received by a first hybrid analog-digital repeater device (e.g., the hybrid analog-digital repeater device 106A) from the master WAP device 104A.

At 610, the WLAN signal 502 may be converted by the first hybrid analog-digital repeater device (e.g., the hybrid analog-digital repeater device 106A) to the first beam of radio frequency (RF) signal 504 in a intermediate frequency band.

At 612, the first beam of RF signals 504 may be relayed in the intermediate frequency band by the first hybrid analog-digital repeater device to one or more second hybrid analog-digital repeater devices (e.g., the hybrid analog-digital repeater devices 106B to 106N) of the plurality of hybrid analog-digital repeater devices 106.

At 614, a differential polarized routing of received and transmitted radio frequency (RF) signals in the intermediate frequency (e.g., mmWave frequency signals) may be executed by each of the plurality of hybrid analog-digital repeater devices 106 in which the downstream communication 114 and the upstream communication 116 may be performed in a different polarization state in the network of the plurality of hybrid analog-digital repeater devices 106.

At 616, the first beam of RF signals 504 may be received by the one or more service WAP devices 108 in the intermediate frequency band from the one or more second hybrid analog-digital repeater devices (e.g., the hybrid analog-digital repeater devices 106B to 106N) and converted back to the WLAN signal 502 to serve one or more UEs 110 in a data throughput greater than a threshold throughput. The plurality of hybrid analog-digital repeater devices 106 may be disposed as a RF bridge between the master WAP device 104A and the one or more service WAP devices 108 such that a data propagation path of user data relayed through a network of the plurality of hybrid analog-digital repeater devices 106 may be analog without any digital decoding or encoding of the user data in the first beam of RF signals 504 to reduce latency less than a threshold time. Further, a backchannel connectivity and control of the network of the plurality of hybrid analog-digital repeater devices 106 may be via a second WLAN frequency, based on the signal metadata 206A of the first beam of RF signals 504. In an implementation, each of the plurality of hybrid analog-digital repeater devices 106 may be configured to extract the signal metadata by digital signal processing of a portion of the first beam of RF signals 504 without decoding the user data of the first beam of RF signals 504.

At 618, the network of the plurality of hybrid analog-digital repeater devices 106 may be controlled by the central cloud server 102 to control to schedule transmit and receive time slot assignments to a plurality of access point devices and the one or more UEs 110 over the backchannel connectivity, where the plurality of access point devices comprises the master WAP device 104A and the one or more service WAP devices 108.

At 620, Multi-User, Multiple Input, Multiple Output (Mu-MIMO) may be performed by each of the master WAP device 104A and the one or more service WAP devices 108 to corresponding connected UEs (e.g., the one or more UEs 110) via corresponding mmWave New Radio Unlicensed (NR-U) links.

At 622, the master WAP device 104A may be caused by the central cloud server 102 to arbitrate a seamless handoffs for the one or more UEs 110 roaming across the one or more service WAP devices 108 connected to the one or more second hybrid analog-digital repeater devices (e.g., the hybrid analog-digital repeater devices 106B to 106N).

At 624, the network of the plurality of hybrid analog-digital repeater devices 106 may be caused to change a topology of the wireless backhaul network by the central cloud server 102 based on a change in signal metrics in the telemetry information received from each of the plurality of hybrid analog-digital repeater devices 106.

Various embodiments of the disclosure may provide the wireless communication system 100A, 100C or 500 (FIG. 1A, 1C, or 3). The wireless communication system 100A, 100C or 500 includes the master WAP device 104A configured to communicate the WLAN signal 122 or 502 in a first WLAN frequency from the data source 112. The plurality of hybrid analog-digital repeater devices 106 may be disposed at a plurality of different locations. A first hybrid analog-digital repeater device (e.g., the hybrid analog-digital repeater device 106A) may be configured to receive the WLAN signal 122 or 502 from the master WAP device 104A. The first hybrid analog-digital repeater device (e.g., the hybrid analog-digital repeater device 106A) may be configured to convert the WLAN signal 122 or 502 to a first beam of RF signals 118 or 504 in an intermediate frequency band and relay the first beam of RF signals 118 or 504 in the intermediate frequency band to one or more second hybrid analog-digital repeater devices (e.g., the hybrid analog-digital repeater devices 106B and 106N) of the plurality of hybrid analog-digital repeater devices 106. The one or more service WAP devices 108 may be configured to receive the first beam of RF signals 118 or 504 in the intermediate frequency band from the one or more second hybrid analog-digital repeater devices (e.g., the hybrid analog-digital repeater devices 106B and 106N) and convert back to the WLAN signal 122 or 502 to serve one or more UEs 110 in a data throughput greater than a threshold throughput. The plurality of hybrid analog-digital repeater devices 106 may be disposed as a radio frequency (RF) bridge between the master WAP device 104A and the one or more service WAP devices 108 such that a data propagation path of user data relayed through a network of the plurality of hybrid analog-digital repeater devices 106 may be analog without any digital decoding or encoding of the user data in the first beam of RF signals to reduce latency less than a threshold time. Further, a backchannel connectivity and control of the network of the plurality of hybrid analog-digital repeater devices 106 may be via a second WLAN frequency, based on the signal metadata 206A of the first beam of RF signals 118 or 504.

Various embodiments of the disclosure may provide a non-transitory computer-readable medium having stored thereon, computer implemented instructions that when executed by a computer causes a communication system to execute operations, the operations comprising communicating, by the master WAP device 104A, a wireless local area network (WLAN) signal in a first WLAN frequency from a data source 112. The operations further comprise receiving, by a first hybrid analog-digital repeater device (e.g., the hybrid analog-digital repeater device 106A) of a plurality of hybrid analog-digital repeater devices 106, the WLAN signal from the master WAP device 104A, converting the WLAN signal to a first beam of RF signals in an intermediate frequency band and relaying the first beam of RF signals in the intermediate frequency band to one or more second hybrid analog-digital repeater devices (e.g., the hybrid analog-digital repeater devices 106B and 106N) of the plurality of hybrid analog-digital repeater devices 106.

The operations further comprise receiving, by one or more service WAP devices 108, the first beam of RF signals in the intermediate frequency band from the one or more second hybrid analog-digital repeater devices (e.g., the hybrid analog-digital repeater devices 106B and 106N) and converting back to the WLAN signal to serve one or more UEs 110 110 in a data throughput greater than a threshold throughput. The plurality of hybrid analog-digital repeater devices 106 may be disposed as a radio frequency (RF) bridge between the master WAP device 104A and the one or more service WAP devices 108 such that: a data propagation path of user data relayed through a network of the plurality of the hybrid analog-digital repeater devices 106 may be analog without any digital decoding or encoding of the user data in the first beam of RF signals to reduce latency less than a threshold time, and a backchannel connectivity and control of the network of the plurality of hybrid analog-digital repeater devices 106 may be via a second WLAN frequency, based on the signal metadata 206A of the first beam of RF signal.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:
1. A wireless communication system, comprising:
    a master wireless access point device configured to communicate a wireless local area network (WLAN) signal in a first WLAN frequency from a data source;
    a plurality of hybrid analog-digital repeater devices disposed at a plurality of different locations, wherein a first hybrid analog-digital repeater device is configured to receive the WLAN signal from the master wireless access point device and convert the WLAN signal to a first beam of radio frequency (RF) signals in an intermediate frequency band and relay the first beam of RF signals in the intermediate frequency band to one or more second hybrid analog-digital repeater devices of the plurality of hybrid analog-digital repeater devices; and
    one or more service wireless access point devices configured to receive the first beam of RF signals in the intermediate frequency band from the one or more second hybrid analog-digital repeater devices and con- vert back to the WLAN signal to serve one or more user equipment (UEs) in a data throughput greater than a threshold throughput,
wherein the plurality of hybrid analog-digital repeater devices are disposed as a radio frequency (RF) bridge between the master wireless access point device and the one or more service wireless access point devices such that:
a data propagation path of user data relayed through a network of the plurality of the hybrid analog-digital repeater devices is analog without any digital decoding or encoding of the user data in the first beam of RF signals to reduce latency less than a threshold time, and
a backchannel connectivity and control of the network of the plurality of hybrid analog-digital repeater devices is via a second WLAN frequency, based on a signal metadata of the first beam of RF signal.

2. The wireless communication system according to claim 1, wherein the second WLAN frequency is less than the first WLAN frequency.

3. The wireless communication system according to claim 1, wherein the data source of the master wireless access point device is one or more of: an optical fiber port connected to an optical fiber for an Internet connection, an Ethernet port connected to an Ethernet cable for the Internet connection, or a 5G or 6G mmWave cellular signal received from a radio access network (RAN) node.

4. The wireless communication system according to claim 1, further comprising a central cloud server configured to orchestrate the plurality of hybrid analog-digital repeater devices to dynamically form a wireless backhaul network based on telemetry information received from each of the plurality of hybrid analog-digital repeater devices, wherein the wireless backhaul network is one of: a wireless backhaul mesh network, a wireless backhaul daisy-chain network, or a user-defined wireless backhaul network topology that defines one or more custom combination of the wireless backhaul mesh network and the wireless backhaul daisy-chain network.

5. The wireless communication system according to claim 4, wherein the telemetry information comprises a unique identifier (ID) of each of the plurality of hybrid analog-digital repeater devices, a geo-location of each of the plurality of hybrid analog-digital repeater devices, an operational state of the plurality of hybrid analog-digital repeater devices, and the signal metadata.

6. The wireless communication system according to claim 4, wherein the central cloud server is further configured to control the network of the plurality of the hybrid analog-digital repeater devices to schedule transmit and receive time slot assignments to a plurality of access point devices and the one or more UEs over the backchannel connectivity, wherein the plurality of access point devices comprises the master wireless access point device and the one or more service wireless access point devices.

7. The wireless communication system according to claim 4, wherein the central cloud server is configured to cause the master wireless access point device to arbitrate a seamless handoffs for the one or more UEs roaming across the one or more service wireless access point devices connected to the one or more second hybrid analog-digital repeater devices.

8. The wireless communication system according to claim 4, wherein the central cloud server is configured to cause the network of the plurality of hybrid analog-digital repeater devices to change a topology of the wireless backhaul network based on a change in signal metrics in the telemetry information received from each of the plurality of hybrid analog-digital repeater devices.

9. The wireless communication system according to claim 1, wherein each of the plurality of hybrid analog-digital repeater devices is configured to extract the signal metadata by digital signal processing of a portion of the first beam of RF signals without decoding the user data of the first beam of RF signal.

10. The wireless communication system according to claim 1, wherein the signal metadata comprises two or more of: timing information associated with a radio frame of the first beam of RF signal, system information, channel state information, a cell identity (ID), a beam ID, a signal strength, a signal to noise ratio (SNR), an interference level, or other signal quality metrics.

11. The wireless communication system according to claim 1, wherein each of the plurality of hybrid analog-digital repeater devices is configured to execute a differential polarized routing of receive and transmit intermediate signals in which a downstream communication and an upstream communication are performed in a different polarization state in the network of the plurality of hybrid analog-digital repeater devices.

12. The wireless communication system according to claim 1, wherein the first WLAN frequency is in a range of 6-9 GHz or a C-band spectrum, and wherein the second WLAN frequency is in a range of 2.4-5 GHz.

13. The wireless communication system according to claim 1, wherein the intermediate frequency band of the first beam of RF signals is a millimeter wave (mmWave) frequency or an intermediate frequency in a range of 10-300 GHz.

14. The wireless communication system according to claim 1, wherein the first WLAN frequency and the intermediate frequency band of the first beam of RF signals is one of: a licensed mmWave spectrum of a network operator or an unlicensed mmWave spectrum, or a combination thereof.

15. The wireless communication system according to claim 1, wherein one or more of the plurality of hybrid analog-digital repeater devices comprises are configured to concurrently route an incoming beam of a radio frequency (RF) signal in the intermediate frequency band received from an upstream node in a first direction to two or more downstream nodes in two or more different directions.

16. The wireless communication system according to claim 1, wherein each of the master wireless access point device and the one or more service wireless access point devices is configured to perform Multi-User, Multiple Input, Multiple Output (Mu-MIMO) to corresponding connected UEs via corresponding mmWave New Radio Unlicensed (NR-U) links.

17. The wireless communication system according to claim 1, wherein each of the master wireless access point device and the one or more service wireless access point devices is configured to perform Multi-User, Multiple Input, Multiple Output (Mu-MIMO) to corresponding connected UEs via corresponding mmWave New Radio (NR) licensed links.

18. A wireless communication method, comprising:
communicating, by a master wireless access point device, a wireless local area network (WLAN) signal in a first WLAN frequency from a data source;
receiving, by a first hybrid analog-digital repeater device of a plurality of hybrid analog-digital repeater devices, the WLAN signal from the master wireless access point device, converting the WLAN signal to a first beam of RF signals in an intermediate frequency band and relaying the first beam of RF signals in the intermediate frequency band to one or more second hybrid analog-digital repeater devices of the plurality of hybrid analog-digital repeater devices; and receiving, by one or more service wireless access point devices, the first beam of RF signals in the intermediate frequency band from the one or more second hybrid analog-digital repeater devices and converting back to the WLAN signal to serve one or more user equipment (UEs) in a data throughput greater than a threshold throughput, wherein the plurality of hybrid analog-digital repeater devices are disposed as a radio frequency (RF) bridge between the master wireless access point device and the one or more service wireless access point devices such that:

a data propagation path of user data relayed through a network of the plurality of the hybrid analog-digital repeater devices is analog without any digital decoding or encoding of the user data in the first beam of RF signals to reduce latency less than a threshold time, and a backchannel connectivity and control of the network of the plurality of hybrid analog-digital repeater devices is via a second WLAN frequency, based on a signal metadata of the first beam of RF signal.

19. The wireless communication method according to claim 18, further comprising orchestrating, by a central cloud server, the plurality of hybrid analog-digital repeater devices to dynamically form a wireless backhaul network topology based on telemetry information received from each of the plurality of hybrid analog-digital repeater devices, wherein the wireless backhaul network topology is one of:
a wireless backhaul mesh network topology, a wireless backhaul daisy-chain network topology, or a user-defined wireless backhaul network topology that defines one or more custom combination of the wireless backhaul mesh network topology and the wireless backhaul daisy-chain network topology.

20. The wireless communication method according to claim 18, further comprising executing, by each of the plurality of hybrid analog-digital repeater devices, a differential polarized routing of receive and transmit radio frequency (RF) signals in the intermediate frequency band in which a downstream communication and an upstream communication are performed in a different polarization state in the network of the plurality of hybrid analog-digital repeater devices.

* * * * *